(12) United States Patent
Huang et al.

(10) Patent No.: US 12,044,824 B2
(45) Date of Patent: Jul. 23, 2024

(54) OPTICAL LENS ASSEMBLY AND PHOTOGRAPHING MODULE

(71) Applicant: NEWMAX TECHNOLOGY CO., LTD., Taichung (TW)

(72) Inventors: Hai-Jo Huang, Taichung (TW); Kun-Rui Wu, Taichung (TW)

( * ) Notice: Subject to any disclaimer, the term of this patent is extended or adjusted under 35 U.S.C. 154(b) by 523 days.

(21) Appl. No.: 17/376,174

(22) Filed: Jul. 15, 2021

(65) Prior Publication Data

US 2022/0342183 A1 Oct. 27, 2022

(30) Foreign Application Priority Data

Apr. 26, 2021 (TW) ................................ 110114859

(51) Int. Cl.
| | | |
|---|---|---|
| G02B 13/00 | (2006.01) | |
| G02B 5/20 | (2006.01) | |
| G02B 9/34 | (2006.01) | |
| G02B 13/02 | (2006.01) | |
| G02B 27/00 | (2006.01) | |

(52) U.S. Cl.
CPC ............ *G02B 13/004* (2013.01); *G02B 5/208* (2013.01); *G02B 9/34* (2013.01); *G02B 13/02* (2013.01); *G02B 27/0025* (2013.01)

(58) Field of Classification Search
CPC ........ G02B 13/004; G02B 5/208; G02B 9/34; G02B 13/02; G02B 27/0025; G02B 13/18
See application file for complete search history.

(56) References Cited

U.S. PATENT DOCUMENTS

| 11,614,605 | B2 * | 3/2023 | Wu ..................... G02B 27/0012 |
| | | | 359/357 |
| 2015/0116569 | A1 * | 4/2015 | Mercado .............. G02B 13/004 |
| | | | 348/335 |
| 2016/0227082 | A1 * | 8/2016 | Hsueh ................ G02B 13/0035 |

* cited by examiner

*Primary Examiner* — Mustak Choudhury
(74) *Attorney, Agent, or Firm* — Bruce Stone LLP; Joseph A. Bruce

(57) ABSTRACT

An optical lens assembly includes, in order from the object side to the image side: a first lens with positive refractive power, a stop, a second lens with negative refractive power, a third lens with negative refractive power, a fourth lens with positive refractive power, wherein a focal length of the optical lens assembly is f, the optical lens assembly has a maximum view angle (field of view) FOV, and following condition is satisfied: 0.16<f/FOV<1.27, so as to achieve the telephoto effect of the optical lens assembly.

17 Claims, 17 Drawing Sheets

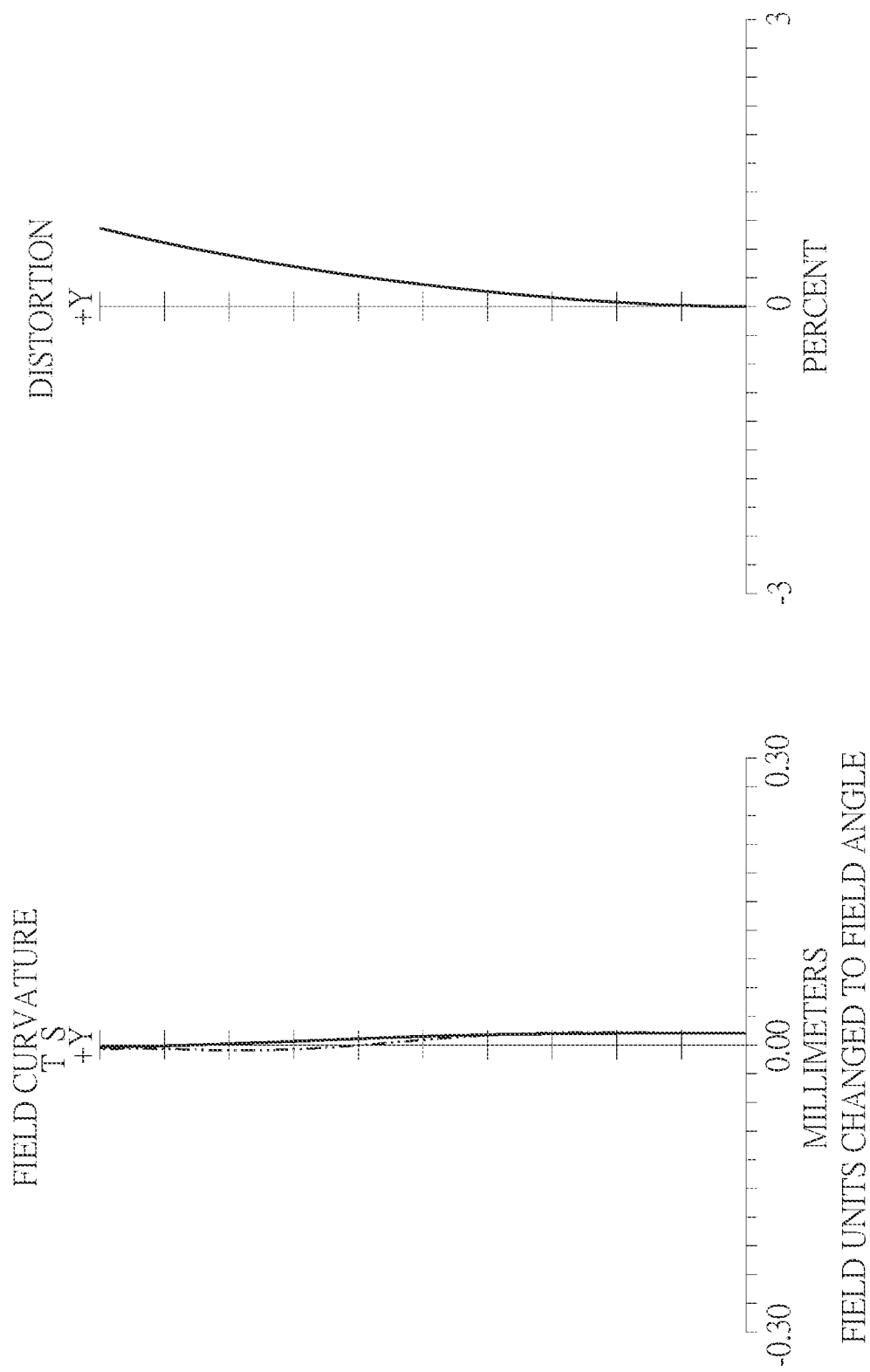

OPTICAL LENS ASSEMBLY AND PHOTOGRAPHING MODULE

BACKGROUND

Field of the Invention

The present invention relates to an optical lens assembly and photographing module, and more particularly to an optical lens assembly and photographing module applicable to electronic products.

Description of Related Art

Miniaturized photographing modules with high image resolution have been the standard equipment for various mobile devices, and as the advanced semiconductor manufacturing technologies have allowed the pixel size of image sensors to be reduced and compact, there's an increasing demand for photographing modules featuring finer image resolution and better image quality. In the era of mobile phone camera functions, the characteristics of large aperture size and ultra-wide field of view of the photographing modules cannot be satisfied, and the demand for telephoto shooting is gradually increasing.

The present invention mitigates and/or obviates the aforementioned disadvantages.

SUMMARY

The primary objective of the present invention is to provide an optical lens assembly and photographing module. When a specific condition is satisfied, the optical lens assembly of the present invention can satisfy the objective of miniaturization and telephoto.

Therefore, an optical lens assembly in accordance with the present invention comprises, in order from an object side to an image side: a first lens with positive refractive power, comprising an object-side surface and an image-side surface, the object-side surface of the first lens being convex near an optical axis, and at least one of the object-side surface and the image-side surface of the first lens being aspheric; a stop; a second lens with negative refractive power, comprising an object-side surface and an image-side surface, the object-side surface of the second lens being convex near the optical axis and the image-side surface of the second lens being concave near the optical axis, and at least one of the object-side surface and the image-side surface of the second lens being aspheric; a third lens with negative refractive power, comprising an object-side surface and an image-side surface, the image-side surface of the third lens being concave near the optical axis, and at least one of the object-side surface and the image-side surface of the third lens being aspheric; a fourth lens with positive refractive power, comprising an object-side surface and an image-side surface, the image-side surface of the fourth lens being convex near the optical axis, and at least one of the object-side surface and the image-side surface of the fourth lens being aspheric.

Wherein a focal length of the optical lens assembly is f, the optical lens assembly has a maximum view angle (field of view) FOV, and following condition is satisfied: $0.16 < f/FOV < 1.27$.

Preferably, the optical lens system has a total of four lenses with refractive power The present invention has the following effect: if the above four lenses with refractive power satisfy the condition $0.16 < f/FOV < 1.27$, it can achieve the telephoto effect of the optical lens assembly. Preferably, following condition can be satisfied: $0.17 < f/FOV < 1.09$.

Preferably, a focal length of the first lens is f1, a focal length of the second lens is f2, and following condition is satisfied: $-1.05 < f1/f2 < -0.23$, which is favorable to reduce the sensitivity and the aberration of the optical lens assembly. Preferably, following condition can be satisfied: $-0.96 < f1/f2 < -0.26$.

Preferably, a focal length of the third lens is f3, a focal length of the fourth lens is f4, and following condition is satisfied: $-45.21 < f3/f4 < 0$, so that the image resolution can be improved evidently. Preferably, following condition can be satisfied: $-41.44 < f3/f4 < 0$.

Preferably, a radius of curvature of the image-side surface of the first lens is R2, a radius of curvature of the object-side surface of the fourth lens is R7, and following condition is satisfied: $-7.21 < R2/R7 < 0$, which can reduce the spherical aberration and astigmatism of the optical lens assembly effectively. Preferably, following condition can be satisfied: $-6.61 < R2/R7 < -0.5$.

Preferably, a radius of curvature of the object-side surface of the third lens is R5, a radius of curvature of the image-side surface of the third lens is R6, and following condition is satisfied: $-12.53 < R5/R6 < 14.71$, which can reduce the spherical aberration and astigmatism of the optical lens assembly effectively. Preferably, following condition can be satisfied: $-11.49 < R5/R6 < 13.49$.

Preferably, the radius of curvature of the object-side surface of the fourth lens is R7, a radius of curvature of the image-side surface of the fourth lens is R8, and following condition is satisfied: $-6.16 < R7/R8 < 2.19$, which can reduce the spherical aberration and astigmatism of the optical lens assembly effectively. Preferably, following condition can be satisfied: $-5.65 < R7/R8 < 2.01$.

Preferably, a central thickness of the first lens along the optical axis is CT1, a central thickness of the second lens along the optical axis is CT2, and following condition is satisfied: $0.32 < CT1/CT2 < 2.41$, so that the thicknesses of the first lens and the second lens can be balanced, which is favorable to achieve a proper balance between miniaturization and the lens formability. Preferably, following condition can be satisfied: $0.36 < CT1/CT2 < 2.21$.

Preferably, a central thickness of the third lens along the optical axis is CT3, a central thickness of the fourth lens along the optical axis is CT4, and following condition is satisfied: $0.39 < CT3/CT4 < 1.80$, so that the thicknesses of the third lens and the fourth lens can be balanced, which is favorable to achieve a proper balance between miniaturization and the lens formability. Preferably, following condition can be satisfied: $0.43 < CT3/CT4 < 1.65$.

Preferably, the focal length of the optical lens assembly is f, a distance from the image-side surface of the fourth lens to an image plane along the optical axis is BFL, and following condition is satisfied: $1.22 < f/BFL < 3.8$, which is favorable to maintain miniaturization and long focal length of the optical lens assembly, which can be used in thin electronic products. Preferably, following condition can be satisfied: $1.37 < f/BFL < 3.48$.

Preferably, a distance from the object-side surface of the first lens to the image-side surface of the fourth lens along the optical axis is TD, the distance from the image-side surface of the fourth lens to the image plane along the optical axis is BFL, and following condition is satisfied: $0.53 < TD/BFL < 2.78$, which is favorable to maintain the back focal length of the optical lens assembly. Preferably, following condition can be satisfied: $0.59 < TD/BFL < 2.55$.

Preferably, a distance from the stop to the image-side surface of the fourth lens along the optical axis is SD, the distance from the image-side surface of the fourth lens to the image plane along the optical axis is BFL, and following condition is satisfied: 0.42<SD/BFL<2.11, so that the back focal length of the optical lens assembly can be distributed appropriately, which is favorable to achieve a proper balance between miniaturization and the telephoto performance. Preferably, following condition can be satisfied: 0.48<SD/BFL<1.93.

Preferably, the focal length of the first lens is f1, the distance from the object-side surface of the first lens to the image-side surface of the fourth lens along the optical axis is TD, and following condition is satisfied: 0.68<f1/TD<1.55, which can provide better telephoto photography effect by adjusting the refractive power of the first lens. Preferably, following condition can be satisfied: 0.76<f1/TD<1.42.

Preferably, a f-number of the optical lens assembly is Fno, the focal length of the optical lens assembly is f, the distance from the image-side surface of the fourth lens to an image plane along the optical axis is BFL, and following conditions are satisfied: 2.70<Fno<3.82 and 1.22<f/BFL<3.8, which is favorable to maintain miniaturization and long focal length of the optical lens assembly, which can be used in thin electronic products. Preferably, following conditions can be satisfied: 2.85<Fno<3.64 and 1.37<f/BFL<3.48.

Preferably, a focal length of the first lens and the second lens combined is f12, a focal length of the third lens and the fourth lens combined is f34, and following condition is satisfied: −0.66<f12/f34<0.7, so that the distribution of the refractive power of the lens assembly will be appropriate, it will be favorable to correct the aberration of the system and improve the image quality. Preferably, following condition can be satisfied: −0.60<f12/f34<0.64.

Preferably, a maximum effective radius of the object-side surface of the first lens is DT11, a maximum effective radius of the image-side surface of the fourth lens is DT42, and following condition is satisfied: 0.74<DT11/DT42<1.99, which is favorable to control the front section size of the optical lens assembly and satisfy the objective of miniaturization. Preferably, following condition can be satisfied: 0.83<DT11/DT42<1.83.

A photographing module in accordance with the present invention comprises the above optical lens assembly, a lens barrel for receiving the optical lens assembly, and an image sensor disposed on the image plane of the optical lens assembly.

Another photographing module in accordance with the present invention comprises an optical lens assembly, a lens barrel for receiving the optical lens assembly, and an image sensor disposed on an image plane of the optical lens assembly.

Wherein an incident pupil aperture of the optical lens assembly is EPD, half of an image height that can be captured by the optical lens assembly on the image plane is IMH, and following condition is satisfied: 0.65<EPD/IMH<2.83, which can ensure adequate light collection and good image quality when the system is miniaturized. Preferably, following condition can be satisfied: 0.73<EPD/IMH<2.60.

Preferably, the optical lens assembly comprises, in order from an object side to an image side: a first lens with positive refractive power, comprising an object-side surface and an image-side surface, the object-side surface of the first lens being convex near an optical axis, and at least one of the object-side surface and the image-side surface of the first lens being aspheric; a stop; a second lens with negative refractive power, comprising an object-side surface and an image-side surface, the object-side surface of the second lens being convex near the optical axis and the image-side surface of the second lens being concave near the optical axis, and at least one of the object-side surface and the image-side surface of the second lens being aspheric; a third lens with negative refractive power, comprising an object-side surface and an image-side surface, the image-side surface of the third lens being concave near the optical axis, and at least one of the object-side surface and the image-side surface of the third lens being aspheric; a fourth lens with positive refractive power, comprising an object-side surface and an image-side surface, the image-side surface of the fourth lens being convex near the optical axis, and at least one of the object-side surface and the image-side surface of the fourth lens being aspheric. Wherein a focal length of the optical lens assembly is f, the optical lens assembly has a maximum view angle (field of view) FOV, and following condition is satisfied: 0.16<f/FOV<1.27. Therefore, if the above four lenses with refractive power satisfy the condition 0.16<f/FOV<1.27, it can achieve the telephoto effect of the optical lens assembly. Preferably, following condition can be satisfied: 0.17<f/FOV<1.09.

Preferably, the optical lens system has a total of four lenses with refractive power.

Preferably, when the conditions 0.65<EPD/IMH<2.83 and 0.16<f/FOV<1.27 are satisfied, a focal length of the first lens is f1, a focal length of the second lens is f2, and following condition is satisfied: −1.05<f1/f2<−0.23, which is favorable to reduce the sensitivity and the aberration of the optical lens assembly. Preferably, following condition can be satisfied: −0.96<f1/f2<−0.26.

Preferably, when the conditions 0.65<EPD/IMH<2.83 and 0.16<f/FOV<1.27 are satisfied, a central thickness of the first lens along the optical axis is CT1, a central thickness of the second lens along the optical axis is CT2, and following condition is satisfied: 0.32<CT1/CT2<2.41, so that the thicknesses of the first lens and the second lens can be balanced, which is favorable to achieve a proper balance between miniaturization and the lens formability. Preferably, following condition can be satisfied: 0.36<CT1/CT2<2.21.

Preferably, when the conditions 0.65<EPD/IMH<2.83 and 0.16<f/FOV<1.27 are satisfied, the focal length of the optical lens assembly is f, a distance from the image-side surface of the fourth lens to the image plane along the optical axis is BFL, and following condition is satisfied: 1.22<f/BFL<3.8, which is favorable to maintain miniaturization and long focal length of the optical lens assembly, which can be used in thin electronic products. Preferably, following condition can be satisfied: 1.37<f/BFL<3.48.

Preferably, when the conditions 0.65<EPD/IMH<2.83 and 0.16<f/FOV<1.27 are satisfied, the focal length of the first lens is f1, a distance from the object-side surface of the first lens to the image-side surface of the fourth lens along the optical axis is TD, and following condition is satisfied: 0.68<f1/TD<1.55, which can contain the strength of the refractive power of the first lens, so as to provide better telephoto photography effect. Preferably, following condition can be satisfied: 0.76<f1/TD<1.42.

Preferably, when the conditions 0.65<EPD/IMH<2.83 and 0.16<f/FOV<1.27 are satisfied, a focal length of the third lens is f3, a focal length of the fourth lens is f4, and following condition is satisfied: −45.21<f3/f4<0, so that the image resolution can be improved evidently. Preferably, following condition can be satisfied: −41.44<f3/f4<0.

Preferably, when the conditions 0.65<EPD/IMH<2.83 and 0.16<f/FOV<1.27 are satisfied, a radius of curvature of the image-side surface of the first lens is R2, a radius of curvature of the object-side surface of the fourth lens is R7, and following condition is satisfied: −7.21<R2/R7<0, which can reduce the spherical aberration and astigmatism of the optical lens assembly effectively. Preferably, following condition can be satisfied: −6.61<R2/R7<−0.5.

Preferably, when the conditions 0.65<EPD/IMH<2.83 and 0.16 <f/FOV<1.27 are satisfied, a radius of curvature of the object-side surface of the third lens is R5, a radius of curvature of the image-side surface of the third lens is R6, and following condition is satisfied: −12.53<R5/R6<14.71, which can reduce the spherical aberration and astigmatism of the optical lens assembly effectively. Preferably, following condition can be satisfied: −11.49<R5/R6<13.49.

Preferably, when the conditions 0.65<EPD/IMH<2.83 and 0.16<f/FOV<1.27 are satisfied, the radius of curvature of the object-side surface of the fourth lens is R7, a radius of curvature of the image-side surface of the fourth lens is R8, and following condition is satisfied: −6.16<R7/R8<2.19, which can reduce the spherical aberration and astigmatism of the optical lens assembly effectively. Preferably, following condition can be satisfied: −5.65<R7/R8<2.01.

Preferably, when the conditions 0.65<EPD/IMH<2.83 and 0.16<f/FOV<1.27 are satisfied, a central thickness of the third lens along the optical axis is CT3, a central thickness of the fourth lens along the optical axis is CT4, and following condition is satisfied: 0.39<CT3/CT4<1.80, so that the thicknesses of the third lens and the fourth lens can be balanced, which is favorable to achieve a proper balance between miniaturization and the lens formability. Preferably, following condition can be satisfied: 0.43<CT3/CT4<1.65.

Preferably, when the conditions 0.65<EPD/IMH<2.83 and 0.16<f/FOV<1.27 are satisfied, the distance from the object-side surface of the first lens to the image-side surface of the fourth lens along the optical axis is TD, the distance from the image-side surface of the fourth lens to the image plane along the optical axis is BFL, and following condition is satisfied: 0.53<TD/BFL<2.78, which is favorable to maintain the back focal length of the optical lens assembly. Preferably, following condition can be satisfied: 0.59<TD/BFL<2.55.

Preferably, when the conditions 0.65<EPD/IMH<2.83 and 0.16<f/FOV<1.27 are satisfied, a distance from the stop to the image-side surface of the fourth lens along the optical axis is SD, the distance from the image-side surface of the fourth lens to the image plane along the optical axis is BFL, and following condition is satisfied: 0.42<SD/BFL<2.11, so that the back focal length of the optical lens assembly can be distributed appropriately, which is favorable to achieve a proper balance between miniaturization and the telephoto performance. Preferably, following condition can be satisfied: 0.48<SD/BFL<1.93.

Preferably, when the conditions 0.65<EPD/IMH<2.83 and 0.16<f/FOV<1.27 are satisfied, a f-number of the optical lens assembly is Fno, the focal length of the optical lens assembly is f, the distance from the image-side surface of the fourth lens to an image plane along the optical axis is BFL, and following conditions are satisfied: 2.70<Fno<3.82 and 1.22<f/BFL<3.8, which is favorable to maintain miniaturization and long focal length of the optical lens assembly, which can be used in thin electronic products. Preferably, following conditions can be satisfied: 2.85<Fno<3.64 and 1.37<f/BFL<3.48.

For each of the above optical lens assemblies or the photographing modules, wherein the focal length of the optical lens assembly is f, and following condition is satisfied: 6.85 mm<f<15.9 mm. Preferably, following condition can be satisfied: 7.23 mm<f<15.18 mm.

For each of the above optical lens assemblies or the photographing modules, the incident pupil aperture of the optical lens assembly is EPD, and following condition is satisfied: 2.02<EPD<5.30. Preferably, following condition can be satisfied: 2.14<EPD<5.06.

For each of the above optical lens assemblies or the photographing modules, the optical lens assembly has the maximum view angle (field of view) FOV, and following condition is satisfied: 14.37 degrees <FOV<44 degrees. Preferably, following condition can be satisfied: 15.13 degrees <FOV<42 degrees.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 2B shows the image plane curve and the distortion curve of the second embodiment of the present invention;

DETAILED DESCRIPTION

Figure 1A:
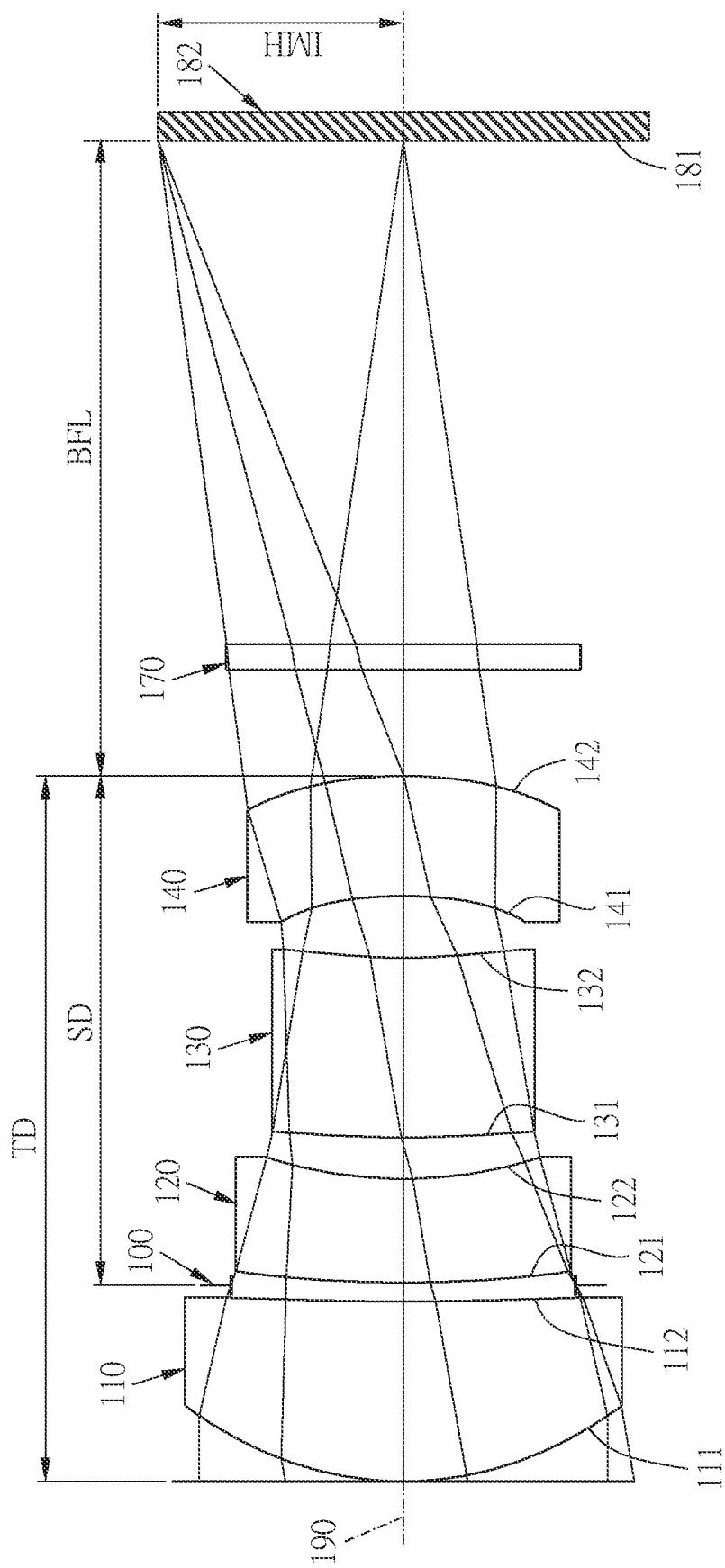
FIG. 1A shows an optical lens assembly in accordance with a first embodiment of the present invention.
Figure 1B:
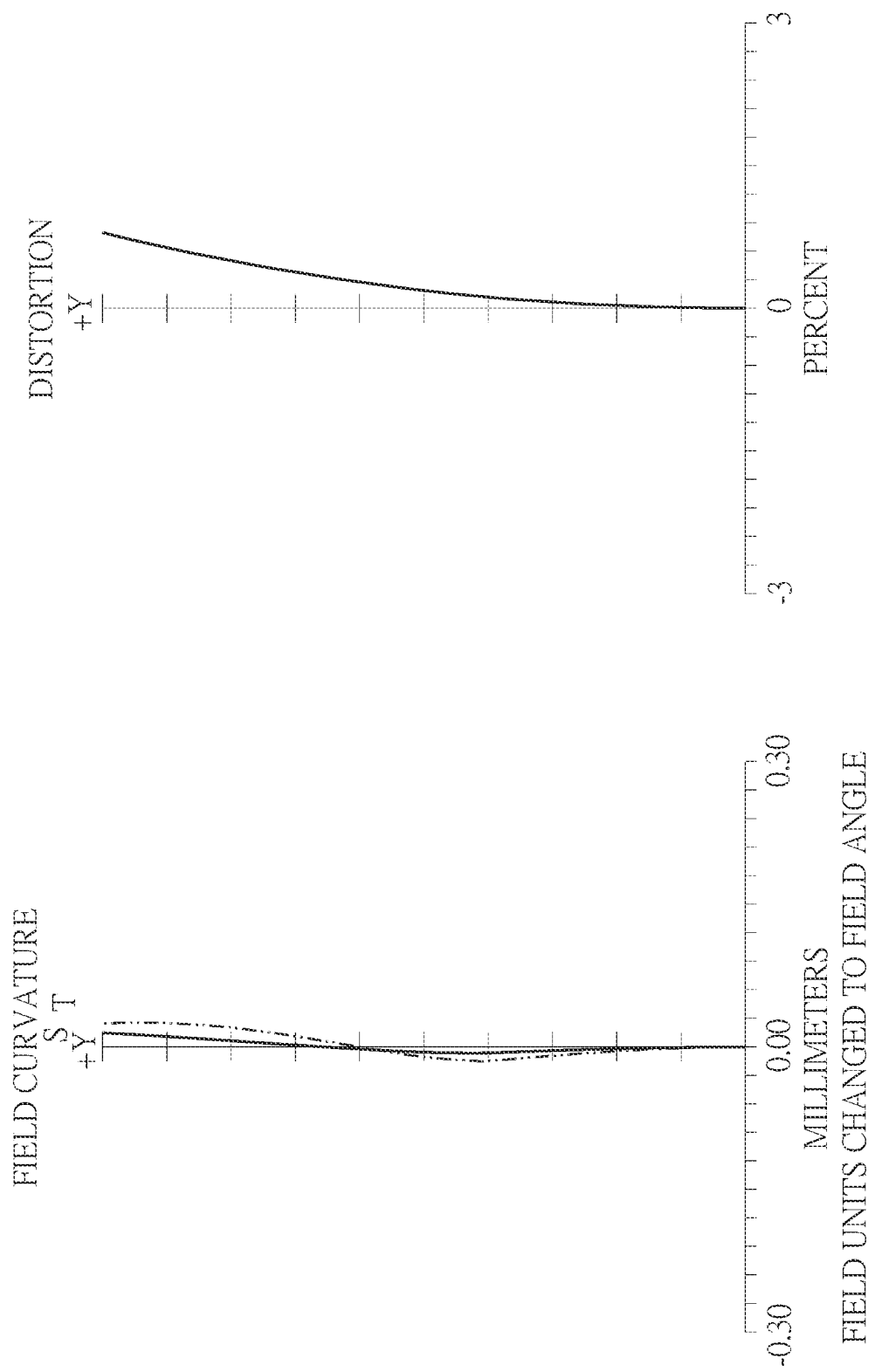
FIG. 1B shows the image plane curve and the distortion curve of the first embodiment of the present invention.

Referring to FIGS. 1A and 1B, FIG. 1A shows an optical lens assembly in accordance with a first embodiment of the present invention, and FIG. 1B shows, in order from left to right, the image plane curve and the distortion curve of the first embodiment of the present invention. An optical lens assembly in accordance with the first embodiment of the present invention comprises a stop 100 and a lens group. The optical lens assembly is provided with an image sensor 182. The lens group comprises, in order from an object side to an image side along an optical axis 190: a first lens 110, a second lens 120, a third lens 130, a fourth lens 140, an IR-cut filter 170, and an image plane 181, wherein the optical lens assembly has a total of four lenses with refractive power, but not limited to this. The stop 100 is disposed between the first lens 110 and the second lens 120. The image sensor 182 is disposed on the image plane 181.

The first lens 110 with positive refractive power, comprising an object-side surface 111 and an image-side surface 112, the object-side surface 111 of the first lens 110 being convex near the optical axis 190 and the image-side surface 112 of the first lens 110 being concave near the optical axis 190, the object-side surface 111 and the image-side surface 112 of the first lens 110 are aspheric, and the first lens 110 is made of plastic material.

The second lens 120 with negative refractive power, comprising an object-side surface 121 and an image-side surface 122, the object-side surface 121 of the second lens 120 being convex near the optical axis 190 and the image-side surface 122 of the second lens 120 being concave near the optical axis 190, the object-side surface 121 and the image-side surface 122 of the second lens 120 are aspheric, and the second lens 120 is made of plastic material.

The third lens 130 with negative refractive power, comprising an object-side surface 131 and an image-side surface 132, the object-side surface 131 of the third lens 130 being convex near the optical axis 190 and the image-side surface 132 of the third lens 130 being concave near the optical axis 190, the object-side surface 131 and the image-side surface 132 of the third lens 130 are aspheric, and the third lens 130 is made of plastic material.

The fourth lens 140 with positive refractive power, comprising an object-side surface 141 and an image-side surface 142, the object-side surface 141 of the fourth lens 140 being concave near the optical axis 190 and the image-side surface 142 of the fourth lens 140 being convex near the optical axis 190, the object-side surface 141 and the image-side surface 142 of the fourth lens 140 are aspheric, and the fourth lens 140 is made of plastic material.

The IR-cut filter 170 made of glass is located between the fourth lens 140 and the image plane 181 and has no influence on the focal length of the optical lens assembly. The IR-cut filter 170 can also be formed on the surfaces of the lenses and made of other materials.

The equation for the aspheric surface profiles of the respective lenses of the first embodiment is expressed as follows:

$$z = \frac{ch^2}{1 + [1-(k+1)c^2h^2]^{0.5}} + Ah^4 + Bh^6 + Ch^8 + Dh^{10} + Eh^{12} + Fh^{14} + Gh^{16} \ldots$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, F, G, . . . : represent the high-order aspheric coefficients.

In the first embodiment of the present optical lens assembly, a focal length of the optical lens assembly is f, a f-number of the optical lens assembly is Fno, the optical lens assembly has a maximum view angle FOV, an incident pupil aperture of the optical lens assembly is EPD, and following conditions are satisfied: f=11.78 mm; Fno=3.47; FOV=19.5 degrees; EPD=3.39; and f/FOV=0.60.

In the first embodiment of the present optical lens assembly, a focal length of the first lens 110 is f1, a focal length of the second lens 120 is f2, and following condition is satisfied: f1/f2=−0.62.

In the first embodiment of the present optical lens assembly, a focal length of the third lens 130 is f3, a focal length of the fourth lens 140 is f4, and following condition is satisfied: f3/f4=−0.14.

In the first embodiment of the present optical lens assembly, a radius of curvature of the image-side surface 112 of the first lens 110 is R2, a radius of curvature of the object-side surface 141 of the fourth lens 140 is R7, and following condition is satisfied: R2/R7=−6.01.

In the first embodiment of the present optical lens assembly, a radius of curvature of the object-side surface 131 of the third lens 130 is R5, a radius of curvature of the image-side surface 132 of the third lens 130 is R6, and following condition is satisfied: R5/R6=1.73.

In the first embodiment of the present optical lens assembly, the radius of curvature of the object-side surface 141 of the fourth lens 140 is R7, a radius of curvature of the image-side surface 142 of the fourth lens 140 is R8, and following condition is satisfied: R7/R8=0.92.

In the first embodiment of the present optical lens assembly, a central thickness of the first lens 110 along the optical axis 190 is CT1, a central thickness of the second lens 120 along the optical axis 190 is CT2, and following condition is satisfied: CT1/CT2=1.73.

In the first embodiment of the present optical lens assembly, a central thickness of the third lens 130 along the optical axis 190 is CT3, a central thickness of the fourth lens 140 along the optical axis 190 is CT4, and following condition is satisfied: CT3/CT4=1.50.

In the first embodiment of the present optical lens assembly, the focal length of the optical lens assembly is f, a distance from the image-side surface 142 of the fourth lens 140 to the image plane 181 along the optical axis 190 is BFL, and following condition is satisfied: f/BFL=2.22.

In the first embodiment of the present optical lens assembly, a distance from the object-side surface 111 of the first lens 110 to the image-side surface 142 of the fourth lens 140 along the optical axis 190 is TD, the distance from the image-side surface 142 of the fourth lens 140 to the image plane 181 along the optical axis 190 is BFL, and following condition is satisfied: TD/BFL=1.11.

In the first embodiment of the present optical lens assembly, a distance from the stop 100 to the image-side surface 142 of the fourth lens 140 along the optical axis 190 is SD, the distance from the image-side surface 142 of the fourth lens 140 to the image plane 181 along the optical axis 190 is BFL, and following condition is satisfied: SD/BFL=0.80.

In the first embodiment of the present optical lens assembly, the focal length of the first lens 110 is f1, the distance from the object-side surface 111 of the first lens 110 to the image-side surface 142 of the fourth lens 140 along the optical axis 190 is TD, and following condition is satisfied: f1/TD=0.98.

In the first embodiment of the present optical lens assembly, a focal length of the first lens 110 and the second lens 120 combined is f12, a focal length of the third lens 130 and the fourth lens 140 combined is f34, and following condition is satisfied: f12/f34=−0.26.

In the first embodiment of the present optical lens assembly, a maximum effective radius of the object-side surface 111 of the first lens 110 is DT11, a maximum effective radius of the image-side surface 142 of the fourth lens 140 is DT42, and following condition is satisfied: DT11/DT42=1.40.

In the first embodiment of the present optical lens assembly, the incident pupil aperture of the optical lens assembly is EPD, half of an image height that can be captured by the optical lens assembly on the image plane 181 is IMH, and following condition is satisfied: EPD/IMH=1.66.

The detailed optical data of the first embodiment is shown in table 1, and the aspheric surface data is shown in table 2.

a gap between the stop 100 and the object-side surface 111 of the first lens 110 along the optical axis 190, surfaces 1, 4, 6, 8, 10 are thicknesses of the first lens 110, the second lens 120, the third lens 130, the fourth lens 140, and the IR-cut filter 170 along the optical axis 190, respectively, surface 2 represents a gap between the first lens 110 and the stop 100 along the optical axis 190, surface 5 represents a gap between the second lens 120 and the third lens 130 along the optical axis 190, surface 7 represents a gap between the third lens 130 and the fourth lens 140 along the optical axis 190, surface 9 represents a gap between the fourth lens 140 and the IR-cut filter 170 along the optical axis 190, surface 11 represents a gap between the IR-cut filter 170 and the image plane 181 along the optical axis 190.

In table 2, k represents the conic coefficient of the equation of the aspheric surface profiles, and A, B, C, D, E, F, G . . . : represent the high-order aspheric coefficients. The

TABLE 1

Embodiment 1 f(focal length) = 11.78 mm, Fno = 3.47, FOV = 19.5 deg.

| surface | | Curvature Radius | | Thickness/gap | Material | Index(nd) | Abbe #(vd) | Focal length |
|---|---|---|---|---|---|---|---|---|
| 0 | object | infinity | | infinity | | | | |
| 1 | Lens 1 | 2.806 | (ASP) | 1.499 | plastic | 1.54 | 56 | 5.75 |
| 2 | | 21.331 | (ASP) | 0.140 | | | | |
| 3 | stop | infinity | | 0.020 | | | | |
| 4 | Lens 2 | 10.918 | (ASP) | 0.864 | plastic | 1.66 | 20.37 | −9.27 |
| 5 | | 3.823 | (ASP) | 0.345 | | | | |
| 6 | Lens 3 | 9.732 | (ASP) | 1.500 | plastic | 1.54 | 56 | −27.81 |
| 7 | | 5.609 | (ASP) | 0.513 | | | | |
| 8 | Lens 4 | −3.549 | (ASP) | 1.000 | plastic | 1.66 | 20.37 | 204.43 |
| 9 | | −3.849 | (ASP) | 0.889 | | | | |
| 10 | IR-cut filter | infinity | | 0.210 | glass | 1.52 | 64.20 | |
| 11 | | infinity | | 4.200 | | | | |
| 12 | Image plane | infinity | | — | | | | |

Note:
reference wavelength is 555 nm

TABLE 2

Aspheric Coefficients

| surface | 1 | 2 | 4 | 5 |
|---|---|---|---|---|
| K: | −5.1324E−01 | 0.0000E+00 | 2.1886E+01 | −1.6527E+00 |
| A: | 8.5539E−04 | −1.1217E−02 | −1.1041E−02 | 1.0399E−03 |
| B: | 6.6255E−04 | 8.9107E−03 | 1.1259E−02 | 9.5456E−03 |
| C: | −3.4726E−04 | −3.6657E−03 | −4.2634E−03 | −4.3894E−03 |
| D: | 8.9916E−05 | 6.1405E−04 | 5.2369E−04 | 5.7039E−03 |
| E: | −1.2021E−05 | −3.8211E−05 | 0.0000E+00 | −4.9698E−03 |
| F: | 0.0000E+00 | 0.0000E+00 | 0.0000E+00 | 1.2793E−03 |
| G: | 0.0000E+00 | 0.0000E+00 | 0.0000E+00 | 0.0000E+00 |

| surface | 6 | 7 | 8 | 9 |
|---|---|---|---|---|
| K: | 0.0000E+00 | 0.0000E+00 | 0.0000E+00 | 3.4821E+00 |
| A: | −9.6162E−03 | −1.9070E−02 | −4.3915E−02 | −1.0001E−02 |
| B: | −3.7962E−03 | 9.2483E−03 | −7.3654E−03 | 8.2858E−04 |
| C: | 1.1706E−02 | −1.9858E−02 | −8.7782E−03 | −1.2825E−03 |
| D: | −4.6777E−03 | 1.0736E−02 | −8.5338E−04 | 5.8501E−04 |
| E: | −4.1428E−03 | −3.9536E−03 | −3.1082E−03 | 2.0171E−04 |
| F: | 3.5234E−03 | 4.3037E−04 | 5.4135E−03 | −2.5552E−04 |
| G: | −7.7530E−04 | −1.6124E−03 | −4.8377E−03 | 6.3565E−05 |

The units of the radius of curvature, the thickness and the focal length in table 1 are expressed in mm, the surface numbers 0-12 represent the surfaces sequentially arranged from the object-side to the image-side along the optical axis, wherein surface 0 represents a gap between an object and the first lens 110 along the optical axis 190, surface 3 represents tables presented below for each embodiment are the corresponding schematic parameter and image plane curves, and the definitions of the tables are the same as Table 1 and Table 2 of the first embodiment. Therefore, an explanation in this regard will not be provided again.

Figure 2A:
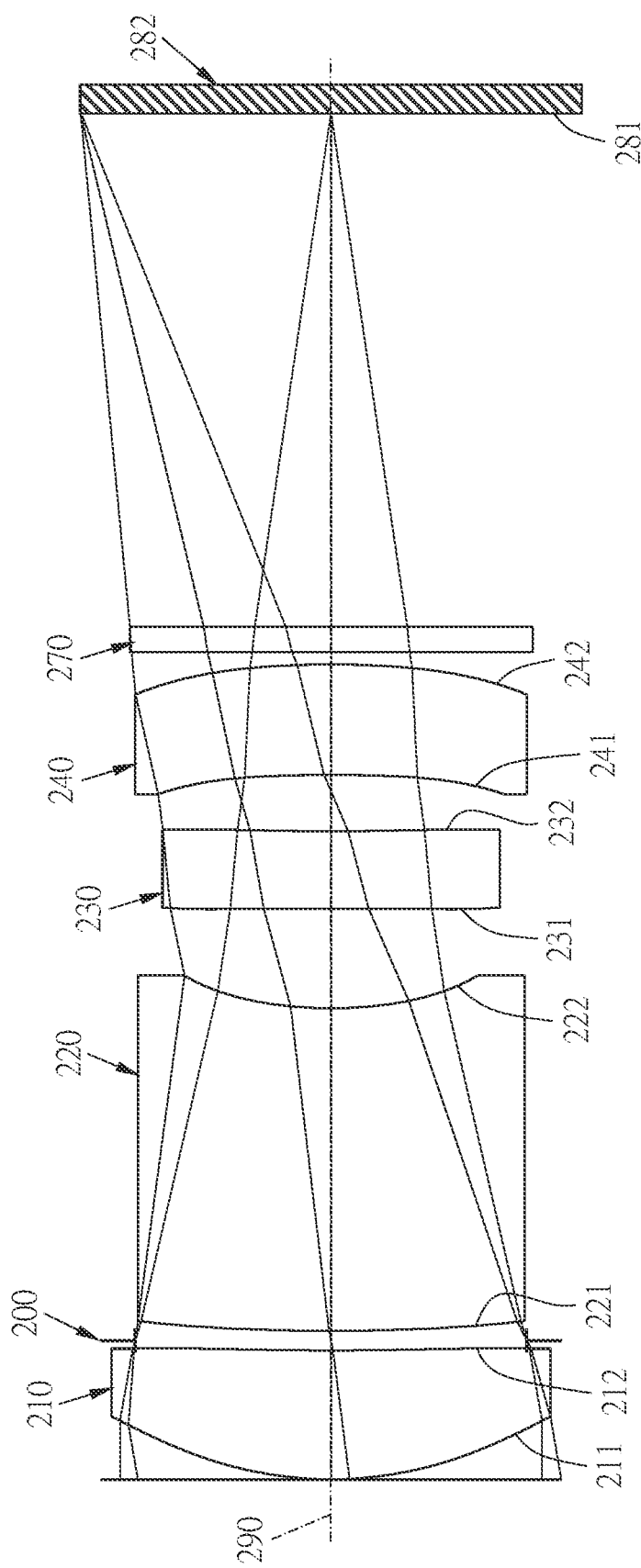
FIG. 2A shows an optical lens assembly in accordance with a second embodiment of the present invention.

Referring to FIGS. 2A and 2B, FIG. 2A shows an optical lens assembly in accordance with a second embodiment of the present invention, and FIG. 2B shows, in order from left to right, the image plane curve and the distortion curve of the second embodiment of the present invention. An optical lens assembly in accordance with the second embodiment of the present invention comprises a stop 200 and a lens group. The optical lens assembly is provided with an image sensor 282. The lens group comprises, in order from an object side to an image side along an optical axis 290: a first lens 210, a second lens 220, a third lens 230, a fourth lens 240, an IR-cut filter 270, and an image plane 281, wherein the optical lens assembly has a total of four lenses with refractive power, but not limited to this. The stop 200 is disposed between the first lens 210 and the second lens 220. The image sensor 282 is disposed on the image plane 281.

The first lens 210 with positive refractive power, comprising an object-side surface 211 and an image-side surface 212, the object-side surface 211 of the first lens 210 being convex near the optical axis 290 and the image-side surface 212 of the first lens 210 being concave near the optical axis 290, the object-side surface 211 and the image-side surface 212 of the first lens 210 are aspheric, and the first lens 210 is made of plastic material.

The second lens 220 with negative refractive power, comprising an object-side surface 221 and an image-side surface 222, the object-side surface 221 of the second lens 220 being convex near the optical axis 290 and the image-side surface 222 of the second lens 220 being concave near the optical axis 290, the object-side surface 221 and the image-side surface 222 of the second lens 220 are aspheric, and the second lens 220 is made of plastic material.

The third lens 230 with negative refractive power, comprising an object-side surface 231 and an image-side surface 232, the object-side surface 231 of the third lens 230 being concave near the optical axis 290 and the image-side surface 232 of the third lens 230 being concave near the optical axis 290, the object-side surface 231 and the image-side surface 232 of the third lens 230 are aspheric, and the third lens 230 is made of plastic material.

The fourth lens 240 with positive refractive power, comprising an object-side surface 241 and an image-side surface 242, the object-side surface 241 of the fourth lens 240 being convex near the optical axis 290 and the image-side surface 242 of the fourth lens 240 being convex near the optical axis 290, the object-side surface 241 and the image-side surface 242 of the fourth lens 240 are aspheric, and the fourth lens 240 is made of plastic material.

The IR-cut filter 270 made of glass is located between the fourth lens 240 and the image plane 281 and has no influence on the focal length of the optical lens assembly. The IR-cut filter 270 can also be formed on the surfaces of the lenses and made of other materials.

The detailed optical data of the second embodiment is shown in table 3, and the aspheric surface data is shown in table 4.

TABLE 3

Embodiment 2 f(focal length) = 11.78 mm, Fno = 3.43, FOV = 19.52 deg.

| surface | | Curvature Radius | | Thickness/gap | Material | Index(nd) | Abbe #(vd) | Focal length |
|---|---|---|---|---|---|---|---|---|
| 0 | object | infinity | | infinity | | | | |
| 1 | Lens 1 | 3.065 | (ASP) | 1.055 | plastic | 1.54 | 56 | 6.37 |
| 2 | | 22.537 | (ASP) | 0.080 | | | | |
| 3 | stop | infinity | | 0.080 | | | | |
| 4 | Lens 2 | 15.669 | (ASP) | 2.641 | plastic | 1.66 | 20.37 | −7.31 |
| 5 | | 3.468 | (ASP) | 0.816 | | | | |
| 6 | Lens 3 | −172.277 | (ASP) | 0.633 | plastic | 1.54 | 56 | −27.52 |
| 7 | | 16.494 | (ASP) | 0.463 | | | | |
| 8 | Lens 4 | −14.612 | (ASP) | 0.902 | plastic | 1.66 | 20.37 | 25.07 |
| 9 | | −7.991 | (ASP) | 0.100 | | | | |
| 10 | IR-cut filter | infinity | | 0.210 | glass | 1.52 | 64.20 | |
| 11 | | infinity | | 4.200 | | | | |
| 12 | Image plane | infinity | | — | | | | |

Note:
reference wavelength is 555 nm

TABLE 4

Aspheric Coefficients

| surface | 1 | 2 | 4 | 5 |
|---|---|---|---|---|
| K: | −8.0800E−01 | 0.0000E+00 | 2.0916E+01 | −3.3453E−01 |
| A: | 1.8012E−04 | −1.6370E−02 | −1.0719E−02 | 1.3007E−02 |
| B: | −1.0489E−04 | 1.0449E−02 | 9.8472E−03 | 1.4907E−02 |
| C: | 1.7842E−04 | −3.4833E−03 | −3.4500E−03 | −8.4736E−03 |
| D: | −1.1071E−04 | 3.3847E−04 | 4.6384E−04 | 4.4781E−03 |
| E: | 4.7293E−06 | 8.9485E−06 | 0.0000E+00 | −2.3155E−04 |
| F: | 0.0000E+00 | 0.0000E+00 | 0.0000E+00 | 4.6495E−05 |

TABLE 4-continued

Aspheric Coefficients

| G: | 0.0000E+00 | 0.0000E+00 | 0.0000E+00 | 0.0000E+00 |
|---|---|---|---|---|
| surface | 6 | 7 | 8 | 9 |
| K: | 0.0000E+00 | 4.1653E+01 | 0.0000E+00 | 1.2850E+01 |
| A: | −1.4117E−02 | −2.9668E−02 | −2.7771E−02 | −1.0593E−02 |
| B: | 2.0848E−02 | 2.8194E−02 | 1.1954E−02 | 1.2442E−03 |
| C: | −1.2386E−02 | −2.2775E−02 | −1.0476E−02 | −1.8158E−04 |
| D: | 2.2916E−03 | 1.1194E−02 | 5.9580E−03 | −1.1865E−04 |
| E: | 1.1916E−03 | −3.9727E−03 | −1.9972E−03 | 1.0616E−04 |
| F: | −4.9373E−05 | 8.5661E−04 | −2.3998E−05 | −5.3852E−05 |
| G: | −1.0456E−04 | −4.5600E−05 | 1.1881E−05 | 1.0507E−05 |

In the second embodiment, the equation of the aspheric surface profiles of the aforementioned lenses is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f[mm] | 11.78 | CT1/CT2 | 0.40 |
| Fno | 3.43 | CT3/CT4 | 0.70 |
| FOV[deg.] | 19.52 | f/BFL | 2.61 |
| f1/f2 | −0.87 | TD/BFL | 1.48 |
| f3/f4 | −1.10 | SD/BFL | 1.23 |
| f12/f34 | 0.07 | EPD/IMH | 1.68 |
| R2/R7 | −1.54 | f/FOV | 0.60 |
| R5/R6 | −10.44 | f1/TD | 0.96 |
| R7/R8 | 1.83 | DT11/DT42 | 1.12 |
| EPD | 3.43 | | |

Figure 3A:
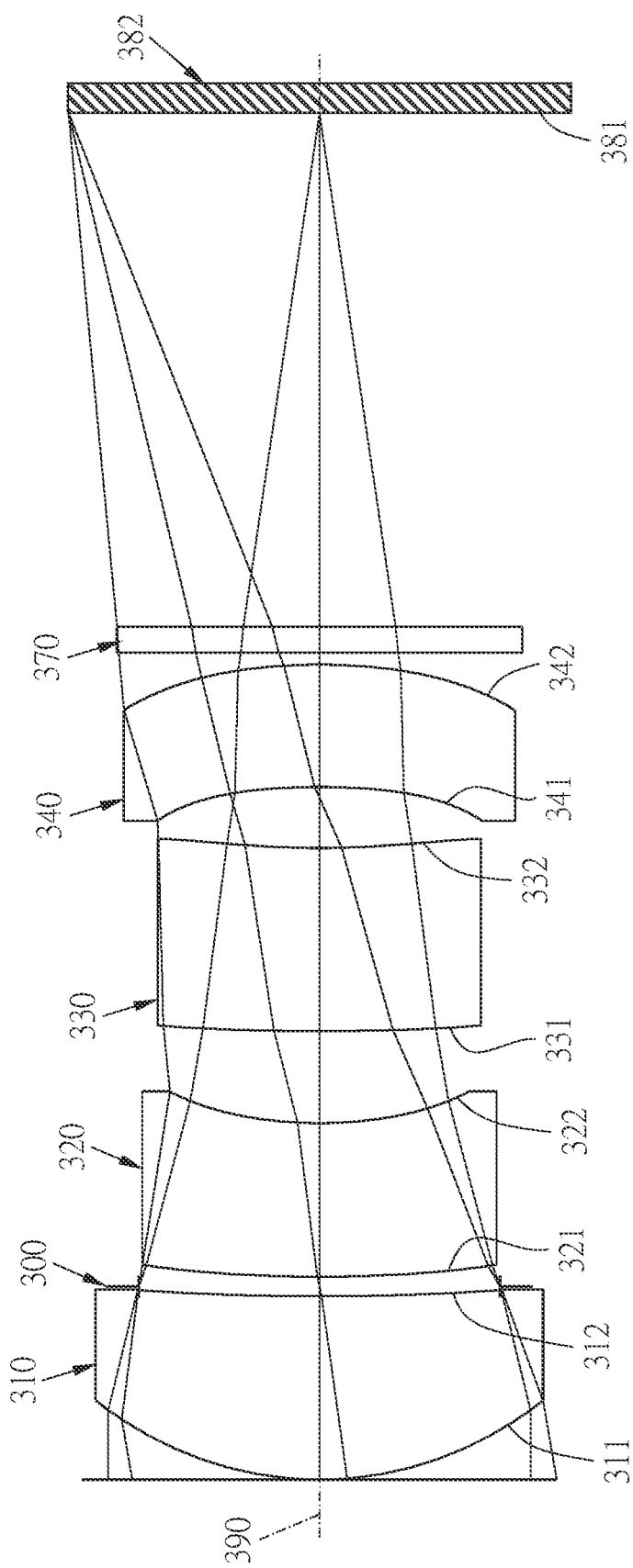
FIG. 3A shows an optical lens assembly in accordance with a third embodiment of the present invention.
Figure 3B:
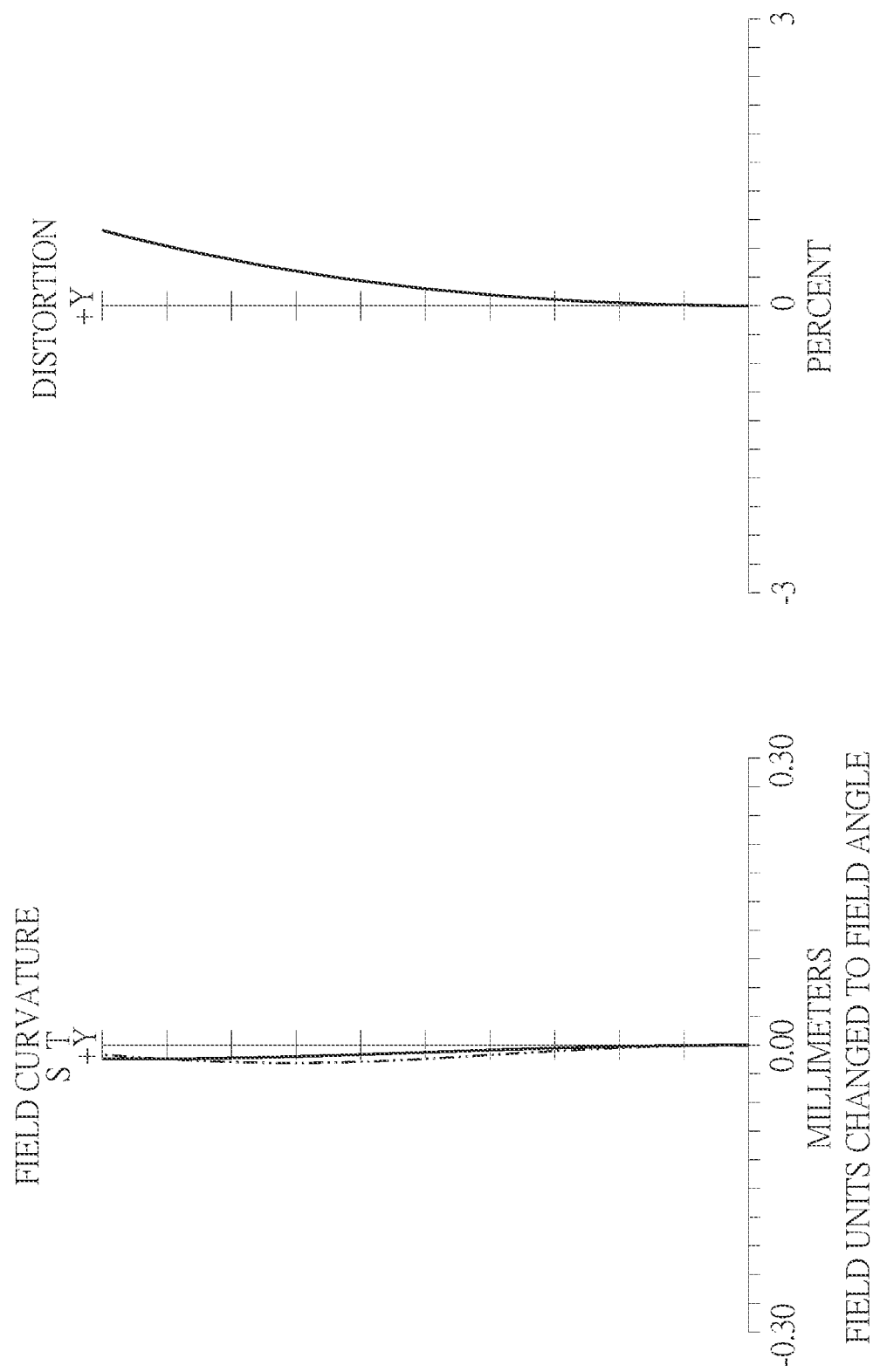
FIG. 3B shows the image plane curve and the distortion curve of the third embodiment of the present invention.

Referring to FIGS. 3A and 3B, FIG. 3A shows an optical lens assembly in accordance with a third embodiment of the present invention, and FIG. 3B shows, in order from left to right, the image plane curve and the distortion curve of the third embodiment of the present invention. An optical lens assembly in accordance with the third embodiment of the present invention comprises a stop 300 and a lens group. The optical lens assembly is provided with an image sensor 382. The lens group comprises, in order from an object side to an image side along an optical axis 390: a first lens 310, a second lens 320, a third lens 330, a fourth lens 340, an IR-cut filter 370, and an image plane 381, wherein the optical lens assembly has a total of four lenses with refractive power, but not limited to this. The stop 300 is disposed between the first lens 310 and the second lens 320. The image sensor 382 is disposed on the image plane 381.

The first lens 310 with positive refractive power, comprising an object-side surface 311 and an image-side surface 312, the object-side surface 311 of the first lens 310 being convex near the optical axis 390 and the image-side surface 312 of the first lens 310 being concave near the optical axis 390, the object-side surface 311 and the image-side surface 312 of the first lens 310 are aspheric, and the first lens 310 is made of plastic material.

The second lens 320 with negative refractive power, comprising an object-side surface 321 and an image-side surface 322, the object-side surface 321 of the second lens 320 being convex near the optical axis 390 and the image-side surface 322 of the second lens 320 being concave near the optical axis 390, the object-side surface 321 and the image-side surface 322 of the second lens 320 are aspheric, and the second lens 320 is made of plastic material.

The third lens 330 with negative refractive power, comprising an object-side surface 331 and an image-side surface 332, the object-side surface 331 of the third lens 330 being convex near the optical axis 390 and the image-side surface 332 of the third lens 330 being concave near the optical axis 390, the object-side surface 331 and the image-side surface 332 of the third lens 330 are aspheric, and the third lens 330 is made of plastic material.

The fourth lens 340 with positive refractive power, comprising an object-side surface 341 and an image-side surface 342, the object-side surface 341 of the fourth lens 340 being concave near the optical axis 390 and the image-side surface 342 of the fourth lens 340 being convex near the optical axis 390, the object-side surface 341 and the image-side surface 342 of the fourth lens 340 are aspheric, and the fourth lens 340 is made of plastic material.

The IR-cut filter 370 made of glass is located between the fourth lens 340 and the image plane 381 and has no influence on the focal length of the optical lens assembly. The IR-cut filter 370 can also be formed on the surfaces of the lenses and made of other materials.

The detailed optical data of the third embodiment is shown in table 5, and the aspheric surface data is shown in table 6.

TABLE 5

Embodiment 3 f(focal length) = 11.78 mm, Fno = 3.43, FOV = 19.5 deg.

| surface | | Curvature Radius | | Thickness/gap | Material | Index(nd) | Abbe #(vd) | Focal length |
|---|---|---|---|---|---|---|---|---|
| 0 | object | infinity | | infinity | | | | |
| 1 | Lens 1 | 2.823 | (ASP) | 1.500 | plastic | 1.54 | 56 | 5.82 |
| 2 | | 20.386 | (ASP) | 0.080 | | | | |
| 3 | stop | infinity | | 0.080 | | | | |
| 4 | Lens 2 | 11.613 | (ASP) | 1.257 | plastic | 1.66 | 20.37 | −7.94 |
| 5 | | 3.479 | (ASP) | 0.754 | | | | |
| 6 | Lens 3 | 18.425 | (ASP) | 1.500 | plastic | 1.54 | 56 | −21.89 |
| 7 | | 7.043 | (ASP) | 0.500 | | | | |
| 8 | Lens 4 | −5.784 | (ASP) | 1.000 | plastic | 1.66 | 20.37 | 35.00 |
| 9 | | −4.956 | (ASP) | 0.100 | | | | |
| 10 | IR-cut filter | infinity | | 0.210 | glass | 1.52 | 64.20 | |
| 11 | | infinity | | 4.200 | | | | |
| 12 | Image plane | infinity | | — | | | | |

Note:
reference wavelength is 555 nm

TABLE 6

Aspheric Coefficients

| surface | 1 | 2 | 4 | 5 |
|---|---|---|---|---|
| K: | −4.1194E−01 | 0.0000E+00 | 2.5771E+01 | −1.3726E+00 |
| A: | 8.5378E−04 | −9.7009E−03 | −9.9792E−03 | 9.9348E−03 |
| B: | 5.3241E−04 | 1.0187E−02 | 1.1148E−02 | 1.1796E−02 |
| C: | −1.2997E−04 | −3.5919E−03 | −4.2863E−03 | −5.3868E−03 |
| D: | 3.2907E−05 | 3.9463E−04 | 5.3726E−04 | 3.8426E−03 |
| E: | −4.7294E−06 | 5.2154E−06 | 0.0000E+00 | −1.8446E−03 |
| F: | 0.0000E+00 | 0.0000E+00 | 0.0000E+00 | 4.9829E−04 |
| G: | 0.0000E+00 | 0.0000E+00 | 0.0000E+00 | 0.0000E+00 |

| surface | 6 | 7 | 8 | 9 |
|---|---|---|---|---|
| K: | 0.0000E+00 | 0.0000E+00 | 0.0000E+00 | 6.1153E+00 |
| A: | −7.0163E−03 | −1.9856E−02 | −3.3768E−02 | −9.1693E−03 |
| B: | 3.1252E−03 | 1.2375E−02 | 3.7411E−03 | 1.5702E−03 |
| C: | 2.0390E−03 | −1.4398E−02 | −8.3322E−03 | −6.5417E−04 |
| D: | −2.7627E−04 | 1.1565E−02 | 5.1671E−03 | 1.9566E−04 |
| E: | −1.6240E−03 | −5.5251E−03 | −1.8024E−03 | 1.2791E−04 |
| F: | 1.1132E−03 | 1.0021E−03 | −7.0609E−05 | −8.8406E−05 |
| G: | −1.8881E−04 | −3.0639E−05 | 3.8532E−05 | 1.7583E−05 |

In the third embodiment, the equation of the aspheric surface profiles of the aforementioned lenses is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f[mm] | 11.78 | CT1/CT2 | 1.19 |
| Fno | 3.43 | CT3/CT4 | 1.50 |
| FOV[deg.] | 19.50 | f/BFL | 2.61 |
| f1/f2 | −0.73 | TD/BFL | 1.48 |
| f3/f4 | −0.63 | SD/BFL | 1.13 |
| f12/f34 | −0.14 | EPD/IMH | 1.68 |
| R2/R7 | −3.52 | f/FOV | 0.60 |
| R5/R6 | 2.62 | f1/TD | 0.87 |
| R7/R8 | 1.17 | DT11/DT42 | 1.14 |
| EPD | 3.43 | | |

Figure 4A:
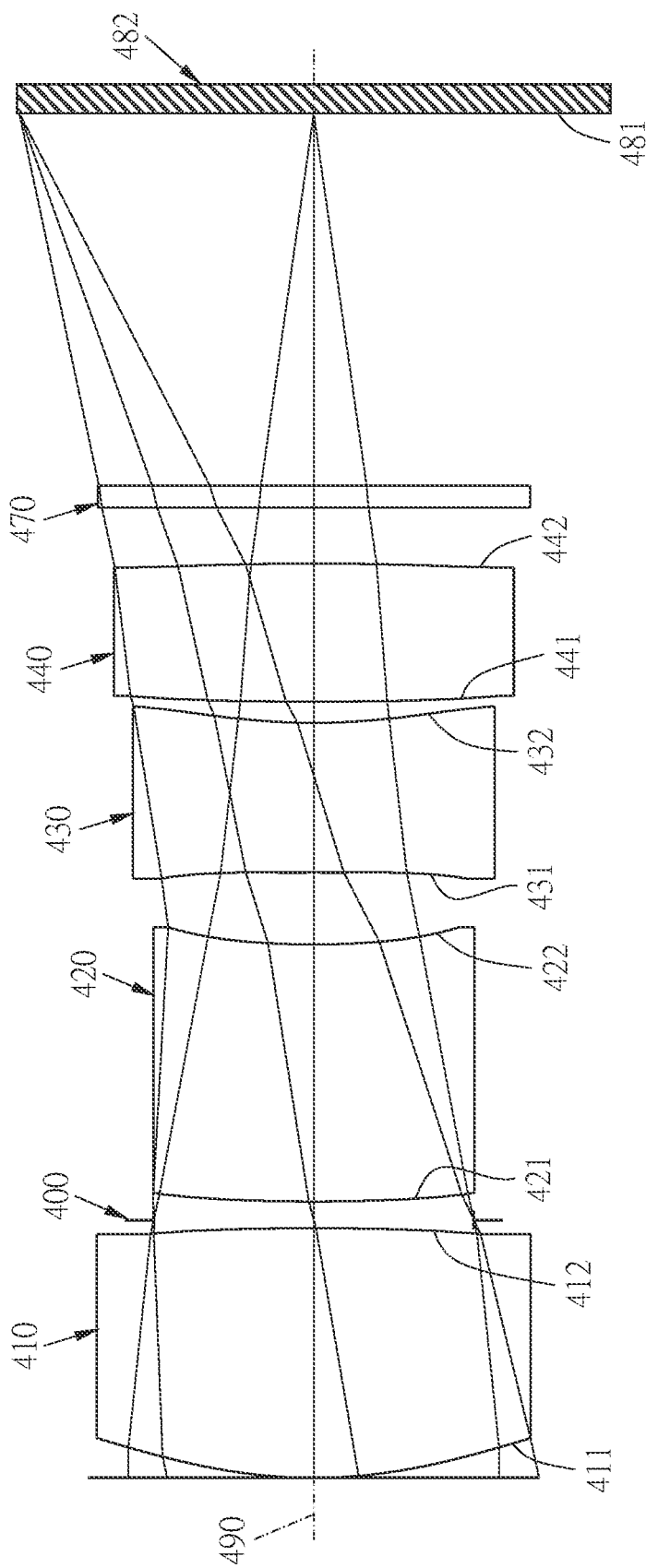
FIG. 4A shows an optical lens assembly in accordance with a fourth embodiment of the present invention.
Figure 4B:
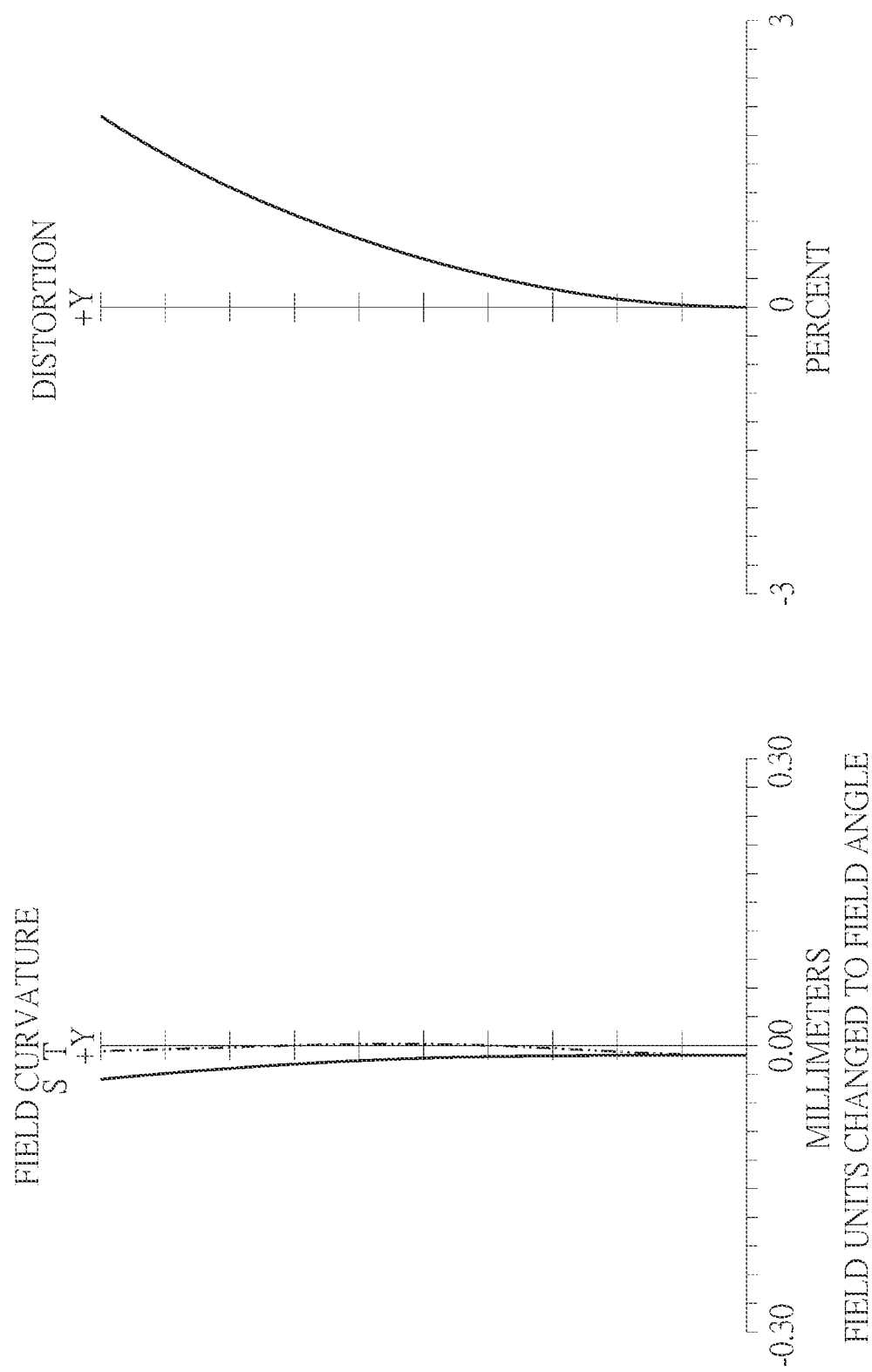
FIG. 4B shows the image plane curve and the distortion curve of the fourth embodiment of the present invention.

Referring to FIGS. 4A and 4B, FIG. 4A shows an optical lens assembly in accordance with a fourth embodiment of the present invention, and FIG. 4B shows, in order from left to right, the image plane curve and the distortion curve of the fourth embodiment of the present invention. An optical lens assembly in accordance with the fourth embodiment of the present invention comprises a stop 400 and a lens group. The optical lens assembly is provided with an image sensor 482. The lens group comprises, in order from an object side to an image side along an optical axis 490: a first lens 410, a second lens 420, a third lens 430, a fourth lens 440, an IR-cut filter 470, and an image plane 481, wherein the optical lens assembly has a total of four lenses with refractive power, but not limited to this. The stop 400 is disposed between the first lens 410 and the second lens 420. The image sensor 482 is disposed on the image plane 481.

The first lens 410 with positive refractive power, comprising an object-side surface 411 and an image-side surface 412, the object-side surface 411 of the first lens 410 being convex near the optical axis 490 and the image-side surface 412 of the first lens 410 being convex near the optical axis 490, the object-side surface 411 and the image-side surface 412 of the first lens 410 are aspheric, and the first lens 410 is made of plastic material.

The second lens 420 with negative refractive power, comprising an object-side surface 421 and an image-side surface 422, the object-side surface 421 of the second lens 420 being convex near the optical axis 490 and the image-side surface 422 of the second lens 420 being concave near the optical axis 490, the object-side surface 421 and the image-side surface 422 of the second lens 420 are aspheric, and the second lens 420 is made of plastic material.

The third lens 430 with negative refractive power, comprising an object-side surface 431 and an image-side surface 432, the object-side surface 431 of the third lens 430 being convex near the optical axis 490 and the image-side surface 432 of the third lens 430 being concave near the optical axis 490, the object-side surface 431 and the image-side surface 432 of the third lens 430 are aspheric, and the third lens 430 is made of plastic material.

The fourth lens 440 with positive refractive power, comprising an object-side surface 441 and an image-side surface 442, the object-side surface 441 of the fourth lens 440 being convex near the optical axis 490 and the image-side surface 442 of the fourth lens 440 being convex near the optical axis 490, the object-side surface 441 and the image-side surface 442 of the fourth lens 440 are aspheric, and the fourth lens 440 is made of plastic material.

The IR-cut filter 470 made of glass is located between the fourth lens 440 and the image plane 481 and has no influence on the focal length of the optical lens assembly. The IR-cut filter 470 can also be formed on the surfaces of the lenses and made of other materials.

The detailed optical data of the fourth embodiment is shown in table 7, and the aspheric surface data is shown in table 8.

TABLE 7

Embodiment 4 f(focal length) = 12.6 mm, Fno = 3.4, FOV = 24.39 deg.

| surface | | Curvature Radius | | Thickness/gap | Material | Index(nd) | Abbe #(vd) | Focal length |
|---|---|---|---|---|---|---|---|---|
| 0 | object | infinity | | infinity | | | | |
| 1 | Lens 1 | 4.838 | (ASP) | 2.385 | plastic | 1.54 | 56 | 8.18 |
| 2 | | −48.196 | (ASP) | 0.079 | | | | |
| 3 | stop | infinity | | 0.176 | | | | |
| 4 | Lens 2 | 19.062 | (ASP) | 2.457 | plastic | 1.66 | 20.37 | −22.32 |
| 5 | | 7.928 | (ASP) | 0.686 | | | | |
| 6 | Lens 3 | 69.251 | (ASP) | 1.429 | plastic | 1.54 | 56 | −11.35 |
| 7 | | 5.649 | (ASP) | 0.204 | | | | |
| 8 | Lens 4 | 43.075 | (ASP) | 1.317 | plastic | 1.66 | 20.37 | 28.21 |
| 9 | | −33.004 | (ASP) | 0.535 | | | | |
| 10 | IR-cut filter | infinity | | 0.210 | glass | 1.52 | 64.20 | |
| 11 | | infinity | | 3.557 | | | | |
| 12 | Image plane | infinity | | — | | | | |

Note:
reference wavelength is 555 nm

TABLE 8

| Aspheric Coefficients | | | | |
|---|---|---|---|---|
| surface | 1 | 2 | 4 | 5 |
| K: | −2.0856E+00 | 1.9984E+02 | 9.3141E+01 | −2.4096E+01 |
| A: | −6.4559E−04 | −9.0343E−03 | −2.6130E−03 | 1.1847E−02 |
| B: | −2.5217E−04 | 2.8475E−03 | 3.3291E−03 | 4.1380E−03 |
| C: | −7.8863E−06 | −6.2927E−04 | −7.5582E−04 | −9.8853E−04 |
| D: | −2.2301E−06 | 5.9922E−05 | 3.8116E−05 | 2.6641E−04 |
| E: | 3.5666E−08 | −3.5790E−06 | 0.0000E+00 | −3.5522E−05 |
| F: | 0.0000E+00 | 0.0000E+00 | 0.0000E+00 | −4.4392E−06 |
| G: | 0.0000E+00 | 0.0000E+00 | 0.0000E+00 | 0.0000E+00 |
| surface | 6 | 7 | 8 | 9 |
| K: | −1.9037E+02 | −3.9821E+01 | −1.3465E+02 | 2.0000E+02 |
| A: | −1.9507E−02 | −1.5152E−02 | −2.8367E−03 | 9.0766E−05 |
| B: | 4.7807E−03 | 9.5400E−03 | 6.0277E−03 | 3.7026E−04 |
| C: | −1.8983E−03 | −5.4469E−03 | −3.0027E−03 | −1.4445E−05 |
| D: | 9.2454E−05 | 1.4096E−03 | 7.0886E−04 | −6.4115E−06 |

TABLE 8-continued

| Aspheric Coefficients | | | | |
|---|---|---|---|---|
| E: | 4.3546E−06 | −1.9210E−04 | −8.5577E−05 | 1.6545E−05 |
| F: | 3.2086E−06 | 7.3593E−06 | 7.2358E−06 | −4.4125E−06 |
| G: | −5.1040E−06 | 1.6056E−06 | −9.2174E−09 | 4.8053E−07 |

In the fourth embodiment, the equation of the aspheric surface profiles of the aforementioned lenses is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f[mm] | 12.60 | CT1/CT2 | 0.97 |
| Fno | 3.40 | CT3/CT4 | 1.08 |
| FOV[deg.] | 24.39 | f/BFL | 2.93 |
| f1/f2 | −0.37 | TD/BFL | 2.03 |
| f/4 | −0.40 | SD/BFL | 1.46 |
| f12/f34 | −0.50 | EPD/IMH | 1.33 |
| R2/R7 | −1.12 | f/FOV | 0.52 |
| R5/R6 | 12.26 | f1/TD | 0.94 |
| R7/R8 | −1.31 | DT11/DT42 | 1.08 |
| EPD | 3.70 | | |

Figure 5A:
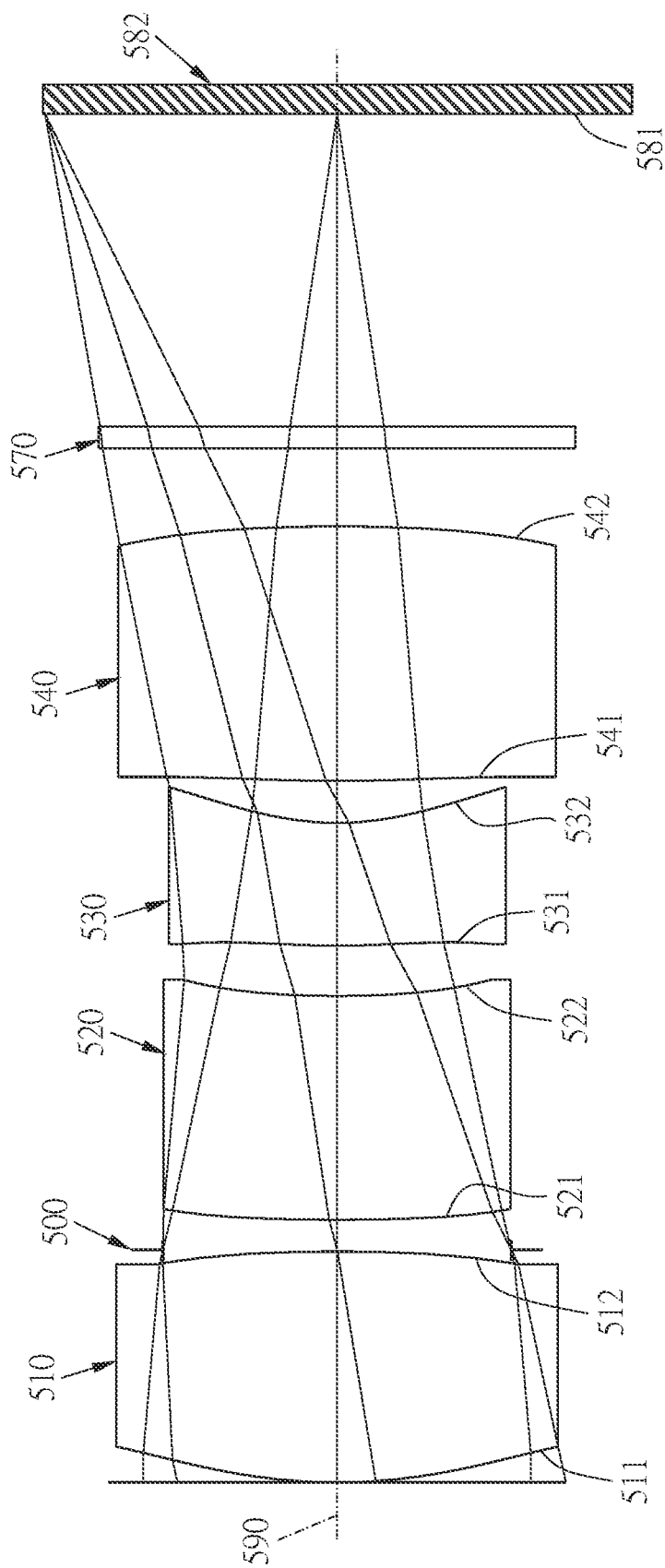
FIG. 5A shows an optical lens assembly in accordance with a fifth embodiment of the present invention.
Figure 5B:
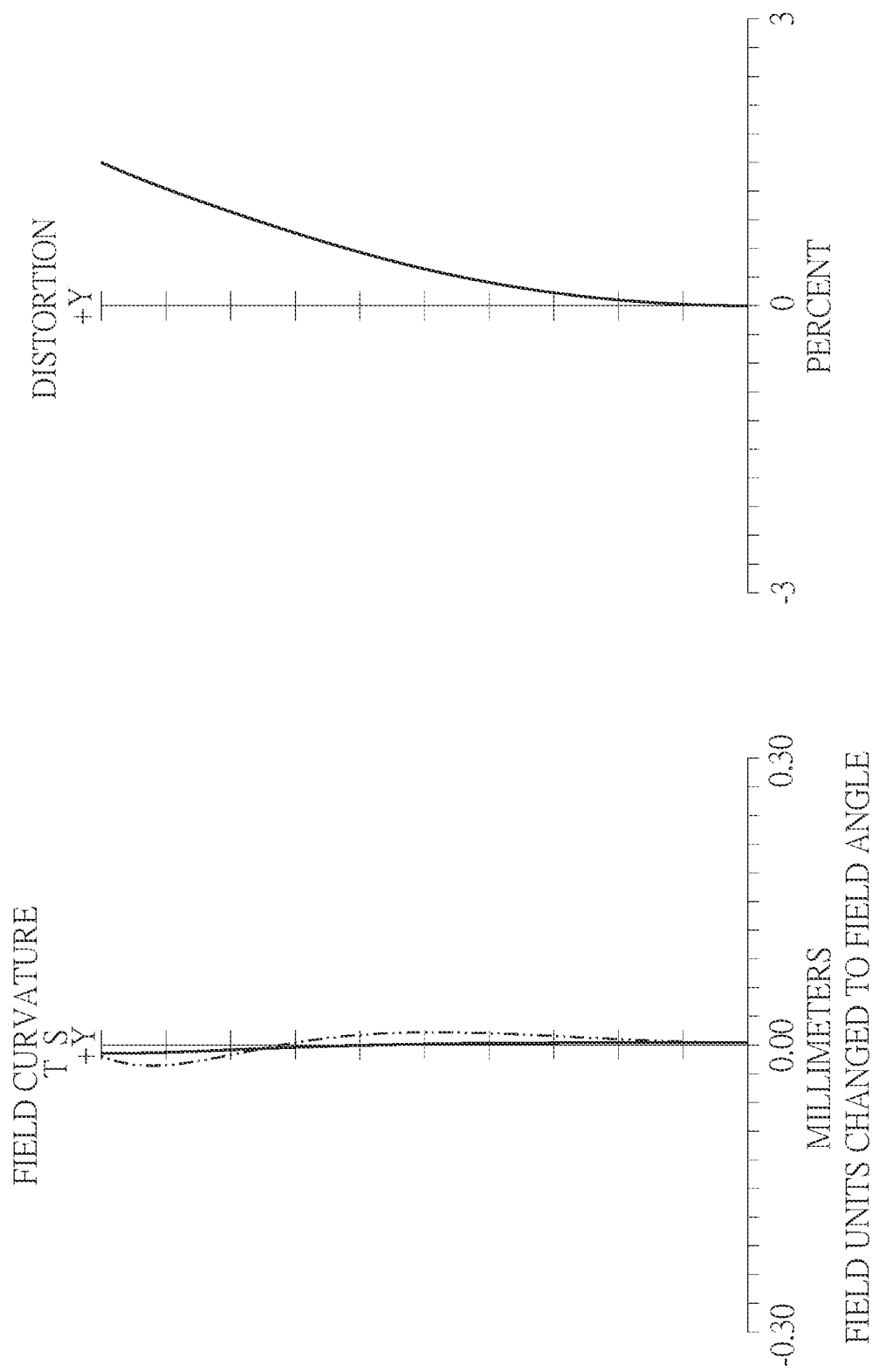
FIG. 5B shows the image plane curve and the distortion curve of the fifth embodiment of the present invention.

Referring to FIGS. 5A and 5B, FIG. 5A shows an optical lens assembly in accordance with a fifth embodiment of the present invention, and FIG. 5B shows, in order from left to right, the image plane curve and the distortion curve of the fifth embodiment of the present invention. An optical lens assembly in accordance with the fifth embodiment of the present invention comprises a stop 500 and a lens group. The optical lens assembly is provided with an image sensor 582. The lens group comprises, in order from an object side to an image side along an optical axis 590: a first lens 510, a second lens 520, a third lens 530, a fourth lens 540, an IR-cut filter 570, and an image plane 581, wherein the optical lens assembly has a total of four lenses with refractive power, but not limited to this. The stop 500 is disposed between the first lens 510 and the second lens 520. The image sensor 582 is disposed on the image plane 581.

The first lens 510 with positive refractive power, comprising an object-side surface 511 and an image-side surface 512, the object-side surface 511 of the first lens 510 being convex near the optical axis 590 and the image-side surface 512 of the first lens 510 being convex near the optical axis 590, the object-side surface 511 and the image-side surface 512 of the first lens 510 are aspheric, and the first lens 510 is made of plastic material.

The second lens 520 with negative refractive power, comprising an object-side surface 521 and an image-side surface 522, the object-side surface 521 of the second lens 520 being convex near the optical axis 590 and the image-side surface 522 of the second lens 520 being concave near the optical axis 590, the object-side surface 521 and the image-side surface 522 of the second lens 520 are aspheric, and the second lens 520 is made of plastic material.

The third lens 530 with negative refractive power, comprising an object-side surface 531 and an image-side surface 532, the object-side surface 531 of the third lens 530 being convex near the optical axis 590 and the image-side surface 532 of the third lens 530 being concave near the optical axis 590, the object-side surface 531 and the image-side surface 532 of the third lens 530 are aspheric, and the third lens 530 is made of plastic material.

The fourth lens 540 with positive refractive power, comprising an object-side surface 541 and an image-side surface 542, the object-side surface 541 of the fourth lens 540 being convex near the optical axis 590 and the image-side surface 542 of the fourth lens 540 being convex near the optical axis 590, the object-side surface 541 and the image-side surface 542 of the fourth lens 540 are aspheric, and the fourth lens 540 is made of plastic material.

The IR-cut filter 570 made of glass is located between the fourth lens 540 and the image plane 581 and has no influence on the focal length of the optical lens assembly. The IR-cut filter 570 can also be formed on the surfaces of the lenses and made of other materials.

The detailed optical data of the fifth embodiment is shown in table 9, and the aspheric surface data is shown in table 10.

TABLE 9

Embodiment 5 f(focal length) = 12.53 mm, Fno = 3.20, FOV = 24.66 deg.

| surface | | Curvature Radius | | Thickness/gap | Material | Index(nd) | Abbe #(vd) | Focal length |
|---|---|---|---|---|---|---|---|---|
| 0 | object | infinity | | infinity | | | | |
| 1 | Lens 1 | 5.185 | (ASP) | 2.219 | plastic | 1.54 | 56 | 7.80 |
| 2 | | −20.332 | (ASP) | 0.015 | | | | |
| 3 | stop | infinity | | 0.291 | | | | |
| 4 | Lens 2 | 19.255 | (ASP) | 2.147 | plastic | 1.66 | 20.37 | −26.89 |
| 5 | | 8.873 | (ASP) | 0.485 | | | | |
| 6 | Lens 3 | 8.611 | (ASP) | 1.179 | plastic | 1.54 | 56 | −7.78 |
| 7 | | 2.707 | (ASP) | 0.403 | | | | |
| 8 | Lens 4 | 16.449 | (ASP) | 2.443 | plastic | 1.54 | 56 | 15.93 |
| 9 | | −17.518 | (ASP) | 0.749 | | | | |
| 10 | IR-cut filter | infinity | | 0.210 | glass | 1.52 | 64.20 | |
| 11 | | infinity | | 3.000 | | | | |
| 12 | Image plane | infinity | | — | | | | |

Note:
reference wavelength is 555 nm

TABLE 10

| Aspheric Coefficients | | | | |
|---|---|---|---|---|
| surface | 1 | 2 | 4 | 5 |
| K: | −2.5133E+00 | 1.1210E+02 | 8.7432E+01 | −6.5006E+01 |
| A: | −1.1443E−03 | −8.4367E−03 | −2.9873E−03 | 1.0491E−02 |
| B: | −3.8845E−04 | 3.0221E−03 | 3.2988E−03 | 4.1503E−03 |
| C: | −3.2641E−05 | −6.1763E−04 | −6.7119E−04 | −1.3440E−03 |
| D: | −4.5596E−07 | 7.3314E−05 | 4.4376E−05 | 1.9066E−04 |
| E: | −2.1935E−07 | 6.6490E−06 | 0.0000E+00 | −4.1246E−05 |
| F: | 0.0000E+00 | 0.0000E+00 | 0.0000E+00 | 6.5378E−06 |
| G: | 0.0000E+00 | 0.0000E+00 | 0.0000E+00 | 0.0000E+00 |
| surface | 6 | 7 | 8 | 9 |
| K: | −8.9215E+01 | −4.1668E+00 | −7.7356E+01 | 5.9547E+01 |
| A: | −1.6225E−02 | −1.1197E−02 | −7.3363E−03 | −2.3201E−03 |
| B: | 4.0956E−03 | 9.3753E−03 | 5.0996E−03 | 5.6418E−04 |
| C: | −1.9003E−03 | −5.6353E−03 | −2.8643E−03 | −1.0888E−04 |
| D: | 6.3204E−05 | 1.4149E−03 | 7.0702E−04 | −2.5467E−05 |
| E: | −9.8689E−06 | −1.8265E−04 | −9.9242E−05 | 2.1084E−05 |
| F: | −5.4519E−06 | 1.2577E−05 | 8.2550E−06 | −3.6229E−06 |
| G: | 2.6996E−06 | 1.4566E−06 | 2.9139E−07 | 2.4714E−07 |

In the fifth embodiment, the equation of the aspheric surface profiles of the aforementioned lenses is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f[mm] | 12.53 | CT1/CT2 | 1.03 |
| Fno | 3.20 | CT3/CT4 | 0.48 |
| FOV[deg.] | 24.66 | f/BFL | 3.17 |
| f1/f2 | −0.29 | TD/BFL | 2.32 |
| f3/f4 | −0.49 | SD/BFL | 1.76 |
| f12/f34 | −0.54 | EPD/IMH | 1.41 |
| R2/R7 | −1.24 | f/FOV | 0.51 |
| R5/R6 | 3.18 | f1/TD | 0.85 |
| R7/R8 | −0.94 | DT11/DT42 | 1.01 |
| EPD | 3.92 | | |

Figure 6A:
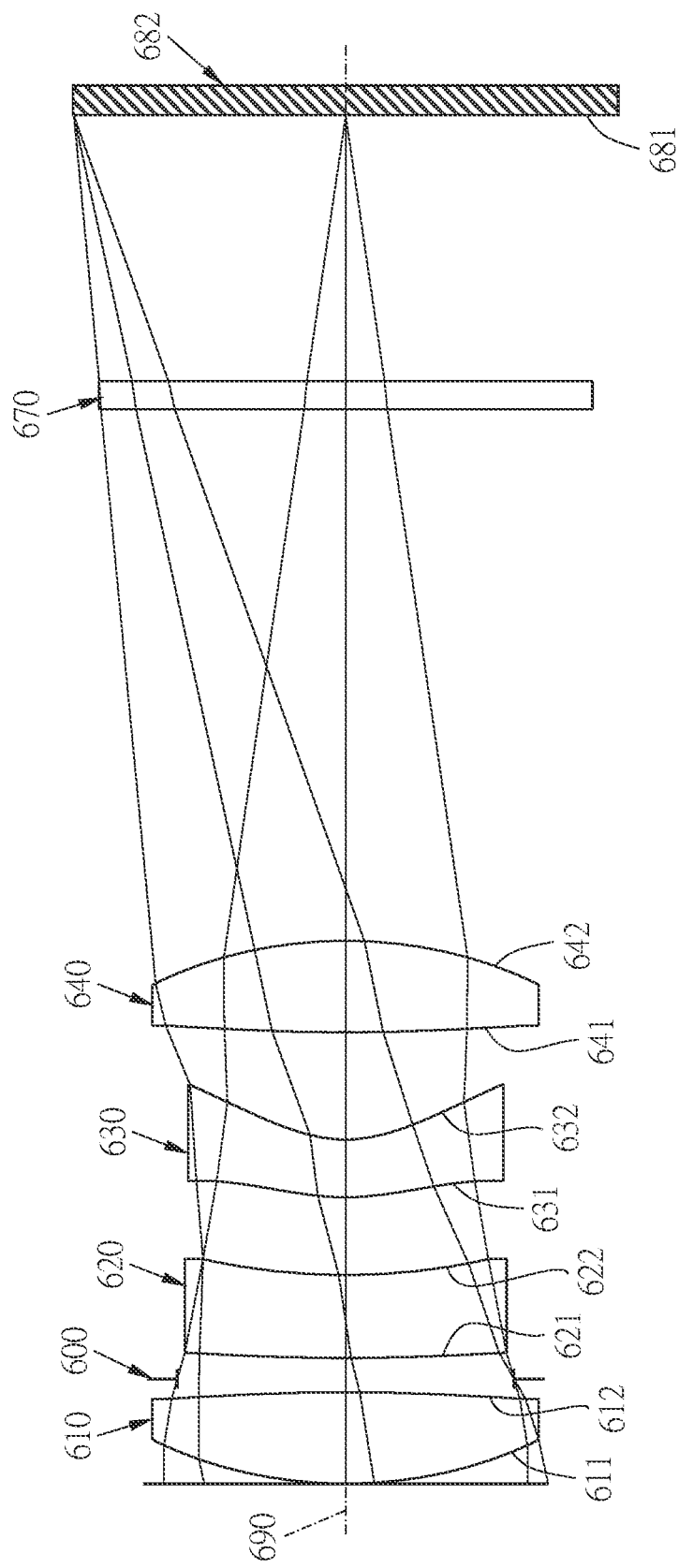
FIG. 6A shows an optical lens assembly in accordance with a sixth embodiment of the present invention.
Figure 6B:
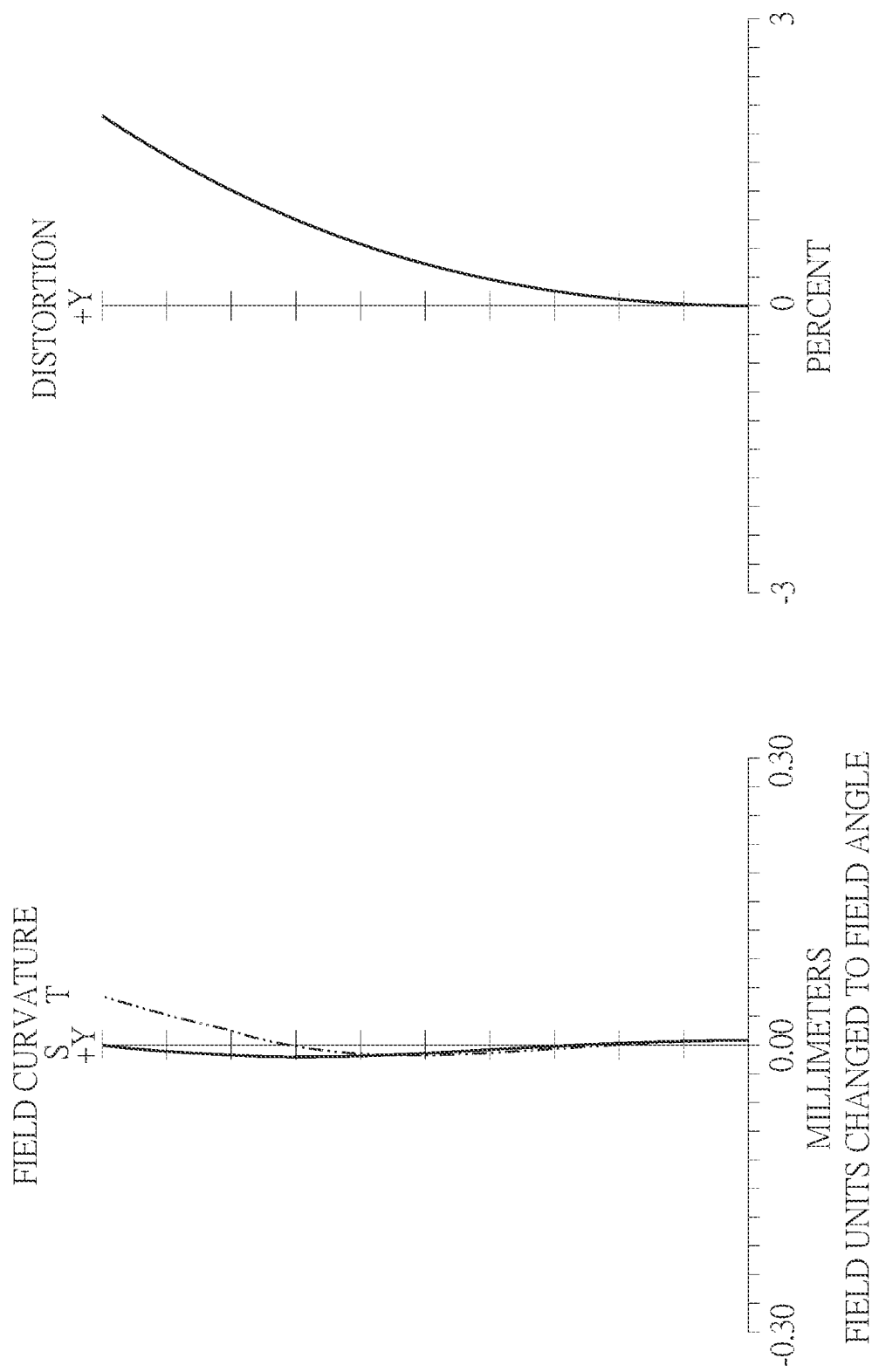
FIG. 6B shows the image plane curve and the distortion curve of the sixth embodiment of the present invention.

Referring to FIGS. 6A and 6B, FIG. 6A shows an optical lens assembly in accordance with a sixth embodiment of the present invention, and FIG. 6B shows, in order from left to right, the image plane curve and the distortion curve of the sixth embodiment of the present invention. An optical lens assembly in accordance with the sixth embodiment of the present invention comprises a stop 600 and a lens group. The optical lens assembly is provided with an image sensor 682. The lens group comprises, in order from an object side to an image side along an optical axis 690: a first lens 610, a second lens 620, a third lens 630, a fourth lens 640, an IR-cut filter 670, and an image plane 681, wherein the optical lens assembly has a total of four lenses with refractive power, but not limited to this. The stop 600 is disposed between the first lens 610 and the second lens 620. The image sensor 682 is disposed on the image plane 681.

The first lens 610 with positive refractive power, comprising an object-side surface 611 and an image-side surface 612, the object-side surface 611 of the first lens 610 being convex near the optical axis 690 and the image-side surface 612 of the first lens 610 being convex near the optical axis 690, the object-side surface 611 and the image-side surface 612 of the first lens 610 are aspheric, and the first lens 610 is made of plastic material.

The second lens 620 with negative refractive power, comprising an object-side surface 621 and an image-side surface 622, the object-side surface 621 of the second lens 620 being convex near the optical axis 690 and the image-side surface 622 of the second lens 620 being concave near the optical axis 690, the object-side surface 621 and the image-side surface 622 of the second lens 620 are aspheric, and the second lens 620 is made of plastic material.

The third lens 630 with negative refractive power, comprising an object-side surface 631 and an image-side surface 632, the object-side surface 631 of the third lens 630 being convex near the optical axis 690 and the image-side surface 632 of the third lens 630 being concave near the optical axis 690, the object-side surface 631 and the image-side surface 632 of the third lens 630 are aspheric, and the third lens 630 is made of plastic material.

The fourth lens 640 with positive refractive power, comprising an object-side surface 641 and an image-side surface 642, the object-side surface 641 of the fourth lens 640 being convex near the optical axis 690 and the image-side surface 642 of the fourth lens 640 being convex near the optical axis 690, the object-side surface 641 and the image-side surface 642 of the fourth lens 640 are aspheric, and the fourth lens 640 is made of plastic material.

The IR-cut filter 670 made of glass is located between the fourth lens 640 and the image plane 681 and has no influence on the focal length of the optical lens assembly. The IR-cut filter 670 can also be formed on the surfaces of the lenses and made of other materials.

The detailed optical data of the sixth embodiment is shown in table 11, and the aspheric surface data is shown in table 12.

TABLE 11

Embodiment 6 f(focal length) = 9.43 mm, Fno = 3.4, FOV = 23.95 deg.

| surface | | Curvature Radius | | Thickness/gap | Material | Index(nd) | Abbe #(vd) | Focal length |
|---|---|---|---|---|---|---|---|---|
| 0 | object | infinity | | infinity | | | | |
| 1 | Lens 1 | 3.403 | (ASP) | 0.686 | plastic | 1.54 | 56 | 5.28 |
| 2 | | −17.467 | (ASP) | 0.101 | | | | |
| 3 | stop | infinity | | 0.156 | | | | |
| 4 | Lens 2 | 17.173 | (ASP) | 0.624 | plastic | 1.66 | 20.37 | −10.98 |
| 5 | | 5.060 | (ASP) | 0.583 | | | | |
| 6 | Lens 3 | 1.922 | (ASP) | 0.433 | plastic | 1.54 | 56 | −4.68 |

TABLE 11-continued

Embodiment 6 f(focal length) = 9.43 mm, Fno = 3.4, FOV = 23.95 deg.

| surface | | Curvature Radius | | Thickness/gap | Material | Index(nd) | Abbe #(vd) | Focal length |
|---|---|---|---|---|---|---|---|---|
| 7 | | 1.009 | (ASP) | 0.807 | | | | |
| 8 | Lens 4 | 17.467 | (ASP) | 0.686 | plastic | 1.54 | 56 | 5.28 |
| 9 | | −3.403 | (ASP) | 3.992 | | | | |
| 10 | IR-cut filter | infinity | | 0.210 | glass | 1.52 | 64.20 | |
| 11 | | infinity | | 2.000 | | | | |
| 12 | Image plane | infinity | | — | | | | |

Note:
reference wavelength is 555 nm

TABLE 12

Aspheric Coefficients

| surface | 1 | 2 | 4 | 5 |
|---|---|---|---|---|
| K: | −4.6357E−01 | 9.9774E+01 | 6.8670E+01 | −2.9247E+01 |
| A: | 2.0857E−04 | −4.6976E−03 | −4.9354E−03 | 2.3710E−02 |
| B: | 1.1176E−03 | 7.4432E−03 | 5.7389E−03 | 5.6531E−03 |
| C: | 1.8245E−04 | −2.5782E−03 | −3.3121E−03 | −8.3346E−03 |
| D: | −6.2975E−05 | 4.3969E−04 | 2.8879E−04 | 2.1383E−03 |
| E: | −2.2944E−05 | 1.0989E−04 | 5.4701E−05 | −6.0389E−04 |
| F: | 2.2936E−05 | 0.0000E+00 | 0.0000E+00 | −2.0421E−05 |
| G: | 5.7898E−06 | 0.0000E+00 | 0.0000E+00 | 6.5113E−05 |

| surface | 6 | 7 | 8 | 9 |
|---|---|---|---|---|
| K: | −7.4591E+00 | −2.5918E+00 | 9.9774E+01 | −4.6357E−01 |
| A: | −9.2940E−02 | −6.8523E−02 | 4.6976E−03 | −2.0857E−04 |
| B: | 2.0916E−02 | 2.9256E−02 | −7.4432E−03 | −1.1176E−03 |
| C: | 2.5437E−03 | −1.0542E−02 | 2.5782E−03 | −1.8245E−04 |
| D: | −4.0562E−03 | 5.2417E−03 | −4.3969E−04 | 6.2975E−05 |
| E: | 7.2016E−04 | −1.5831E−03 | −1.0989E−04 | 2.2944E−05 |
| F: | −8.3934E−04 | −6.3654E−04 | 0.0000E+00 | −2.2936E−05 |
| G: | 4.3033E−04 | 3.9285E−04 | 0.0000E+00 | −5.7898E−06 |

In the sixth embodiment, the equation of the aspheric surface profiles of the aforementioned lenses is the same as the equation of the first embodiment. Also, the definitions of these parameters shown in the following table are the same as those stated in the first embodiment with corresponding values for the sixth embodiment, so an explanation in this regard will not be provided again.

Moreover, these parameters can be calculated from Table 11 and Table 12 as the following values and satisfy the following conditions:

Embodiment 6

| f[mm] | 9.43 | CT1/CT2 | 1.10 |
|---|---|---|---|
| Fno | 3.40 | CT3/CT4 | 0.63 |
| FOV[deg.] | 23.95 | f/BFL | 1.52 |
| f1/f2 | −0.48 | TD/BFL | 0.66 |
| f3/f4 | −0.89 | SD/BFL | 0.53 |
| f12/f34 | 0.07 | EPD/IMH | 1.36 |
| R2/R7 | −1.00 | f/FOV | 0.39 |
| R5/R6 | 1.90 | f1/TD | 1.29 |
| R7/R8 | −5.13 | DT11/DT42 | 1.00 |
| EPD | 2.77 | | |

Figure 7A:
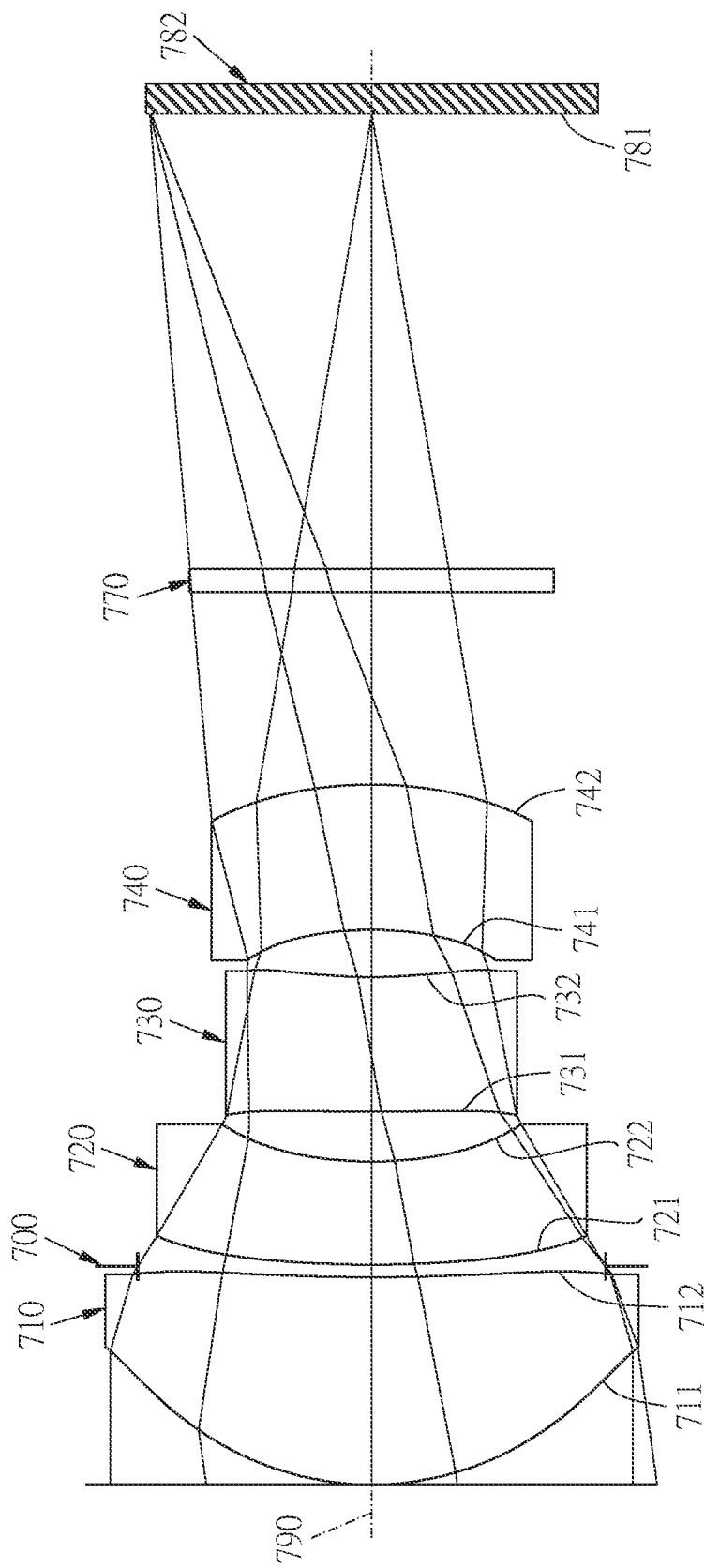
FIG. 7A shows an optical lens assembly in accordance with a seventh embodiment of the present invention.
Figure 7B:
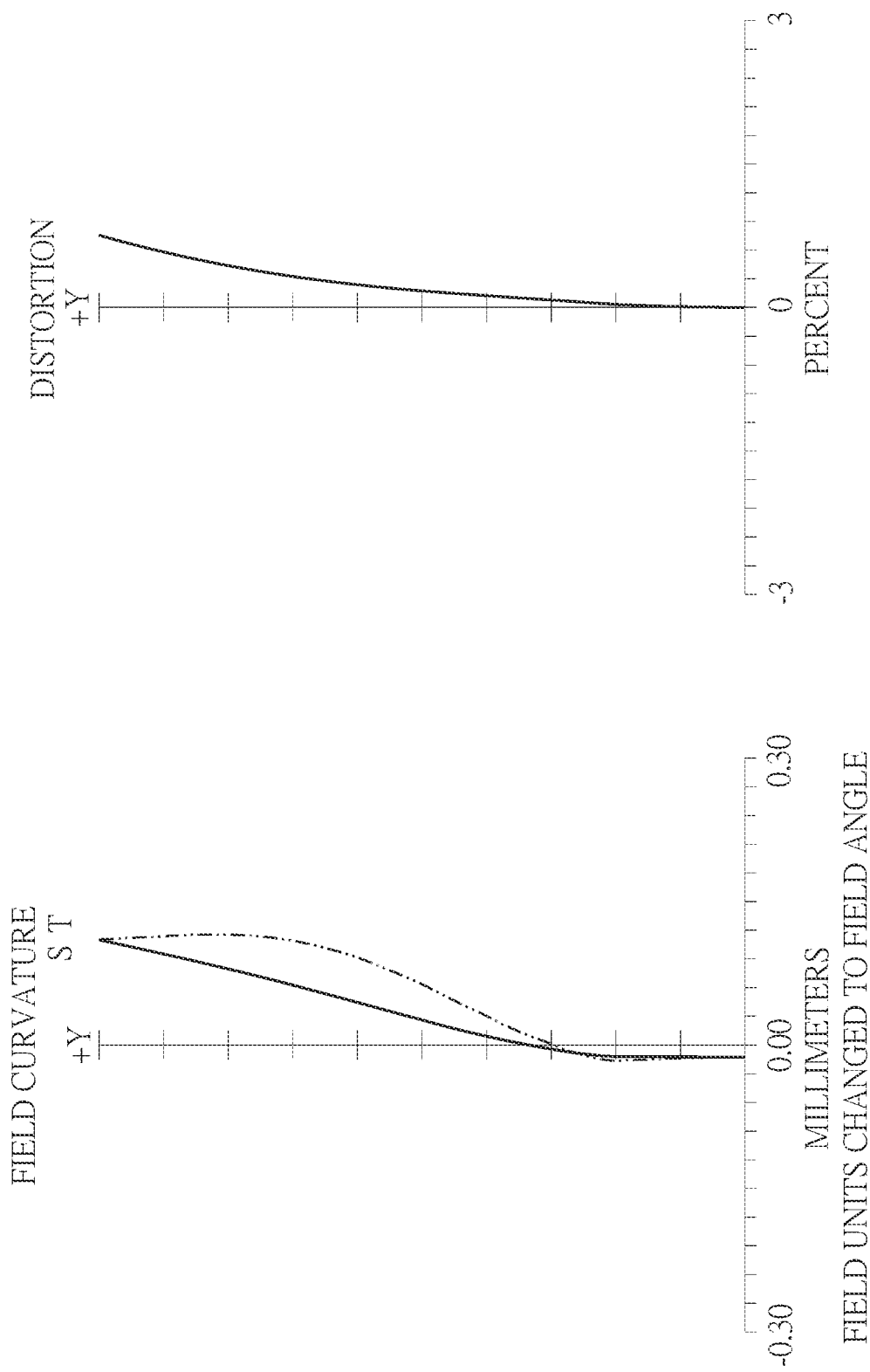
FIG. 7B shows the image plane curve and the distortion curve of the seventh embodiment of the present invention.

Referring to FIGS. 7A and 7B, FIG. 7A shows an optical lens assembly in accordance with a seventh embodiment of the present invention, and FIG. 7B shows, in order from left to right, the image plane curve and the distortion curve of the seventh embodiment of the present invention. An optical lens assembly in accordance with the seventh embodiment of the present invention comprises a stop 700 and a lens group. The optical lens assembly is provided with an image sensor 782. The lens group comprises, in order from an object side to an image side along an optical axis 790: a first lens 710, a second lens 720, a third lens 730, a fourth lens 740, an IR-cut filter 770, and an image plane 781, wherein the optical lens assembly has a total of four lenses with refractive power, but not limited to this. The stop 700 is disposed between the first lens 710 and the second lens 720. The image sensor 782 is disposed on the image plane 781.

The first lens 710 with positive refractive power, comprising an object-side surface 711 and an image-side surface 712, the object-side surface 711 of the first lens 710 being convex near the optical axis 790 and the image-side surface 712 of the first lens 710 being concave near the optical axis 790, the object-side surface 711 and the image-side surface 712 of the first lens 710 are aspheric, and the first lens 710 is made of plastic material.

The second lens 720 with negative refractive power, comprising an object-side surface 721 and an image-side surface 722, the object-side surface 721 of the second lens 720 being convex near the optical axis 790 and the image-side surface 722 of the second lens 720 being concave near the optical axis 790, the object-side surface 721 and the image-side surface 722 of the second lens 720 are aspheric, and the second lens 720 is made of plastic material.

The third lens 730 with negative refractive power, comprising an object-side surface 731 and an image-side surface 732, the object-side surface 731 of the third lens 730 being convex near the optical axis 790 and the image-side surface 732 of the third lens 730 being concave near the optical axis 790, the object-side surface 731 and the image-side surface 732 of the third lens 730 are aspheric, and the third lens 730 is made of plastic material.

The fourth lens 740 with positive refractive power, comprising an object-side surface 741 and an image-side surface 742, the object-side surface 741 of the fourth lens 740 being concave near the optical axis 790 and the image-side surface 742 of the fourth lens 740 being convex near the optical axis 790, the object-side surface 741 and the image-side surface 742 of the fourth lens 740 are aspheric, and the fourth lens 740 is made of plastic material.

The IR-cut filter 770 made of glass is located between the fourth lens 740 and the image plane 781 and has no influence on the focal length of the optical lens assembly. The IR-cut filter 770 can also be formed on the surfaces of the lenses and made of other materials.

The detailed optical data of the seventh embodiment is shown in table 13, and the aspheric surface data is shown in table 14.

TABLE 13

Embodiment 7 f(focal length) = 14.45 mm, Fno = 3.0, FOV = 15.93 deg.

| surface | | Curvature Radius | | Thickness/gap | Material | Index(nd) | Abbe #(vd) | Focal length |
|---|---|---|---|---|---|---|---|---|
| 0 | object | infinity | | infinity | | | | |
| 1 | Lens 1 | 2.724 | (ASP) | 1.913 | plastic | 1.54 | 56 | 5.69 |
| 2 | | 16.549 | (ASP) | 0.099 | | | | |
| 3 | stop | infinity | | 0.016 | | | | |
| 4 | Lens 2 | 10.926 | (ASP) | 0.952 | plastic | 1.66 | 20.37 | −8.81 |
| 5 | | 3.687 | (ASP) | 0.459 | | | | |
| 6 | Lens 3 | 18.213 | (ASP) | 1.243 | plastic | 1.54 | 56 | −12.98 |
| 7 | | 4.980 | (ASP) | 0.436 | | | | |
| 8 | Lens 4 | −3.393 | (ASP) | 1.341 | plastic | 1.66 | 20.37 | 179.91 |
| 9 | | −3.821 | (ASP) | 1.776 | | | | |
| 10 | IR-cut filter | infinity | | 0.210 | glass | 1.52 | 64.20 | |
| 11 | | infinity | | 4.200 | | | | |
| 12 | Image plane | infinity | | — | | | | |

Note:
reference wavelength is 555 nm

TABLE 14

Aspheric Coefficients

| surface | 1 | 2 | 4 | 5 |
|---|---|---|---|---|
| K: | −4.6871E−01 | 1.5051E+01 | 1.7537E+01 | 1.6928E−01 |
| A: | 1.4459E−03 | −1.1054E−02 | −9.2149E−03 | 4.4154E−03 |
| B: | 7.9095E−04 | 8.8322E−03 | 1.1551E−02 | 1.2609E−02 |
| C: | −3.4051E−04 | −3.6825E−03 | −4.1861E−03 | −3.7576E−03 |
| D: | 9.2295E−05 | 6.1267E−04 | 5.3452E−04 | 5.9258E−03 |
| E: | −1.1110E−05 | −3.8334E−05 | −2.7072E−07 | −5.0239E−03 |
| F: | 1.1671E−07 | 1.9404E−07 | −7.3962E−07 | 1.2513E−03 |
| G: | 0.0000E+00 | 0.0000E+00 | 0.0000E+00 | 0.0000E+00 |

| surface | 6 | 7 | 8 | 9 |
|---|---|---|---|---|
| K: | −1.1781E+02 | −9.2720E+00 | −1.6159E+00 | 2.2701E+00 |
| A: | −1.6450E−02 | −2.3403E−02 | −3.8835E−02 | −3.9788E−03 |
| B: | −6.1566E−03 | 7.0157E−03 | −1.8808E−03 | 6.6173E−04 |
| C: | 1.0979E−02 | −2.0888E−02 | −2.3734E−03 | 1.1673E−05 |
| D: | −5.1127E−03 | 1.1339E−02 | 1.1325E−03 | 1.0595E−03 |
| E: | −4.3718E−03 | −2.5955E−03 | −4.3391E−03 | −2.7232E−05 |
| F: | 3.4951E−03 | 1.2620E−03 | 4.8592E−03 | −4.4092E−04 |
| G: | −6.7317E−04 | −1.9292E−03 | −3.3415E−03 | 1.2163E−04 |

In the seventh embodiment, the equation of the aspheric surface profiles of the aforementioned lenses is the same as the equation of the first embodiment. Also, the definitions of these parameters shown in the following table are the same as those stated in the first embodiment with corresponding values for the seventh embodiment, so an explanation in this regard will not be provided again.

Moreover, these parameters can be calculated from Table 13 and Table 14 as the following values and satisfy the following conditions:

Embodiment 7

| f[mm] | 14.45 | CT1/CT2 | 2.01 |
|---|---|---|---|
| Fno | 3.00 | CT3/CT4 | 0.93 |
| FOV[deg.] | 15.93 | f/BFL | 2.34 |
| f1/f2 | −0.65 | TD/BFL | 1.04 |
| f3/f4 | −0.07 | SD/BFL | 0.72 |
| f12/f34 | −0.55 | EPD/IMH | 2.36 |
| R2/R7 | −4.88 | f/FOV | 0.91 |
| R5/R6 | 3.66 | f1/TD | 0.88 |
| R7/R8 | 0.89 | DT11/DT42 | 1.66 |
| EPD | 4.82 | | |

Figure 8A:
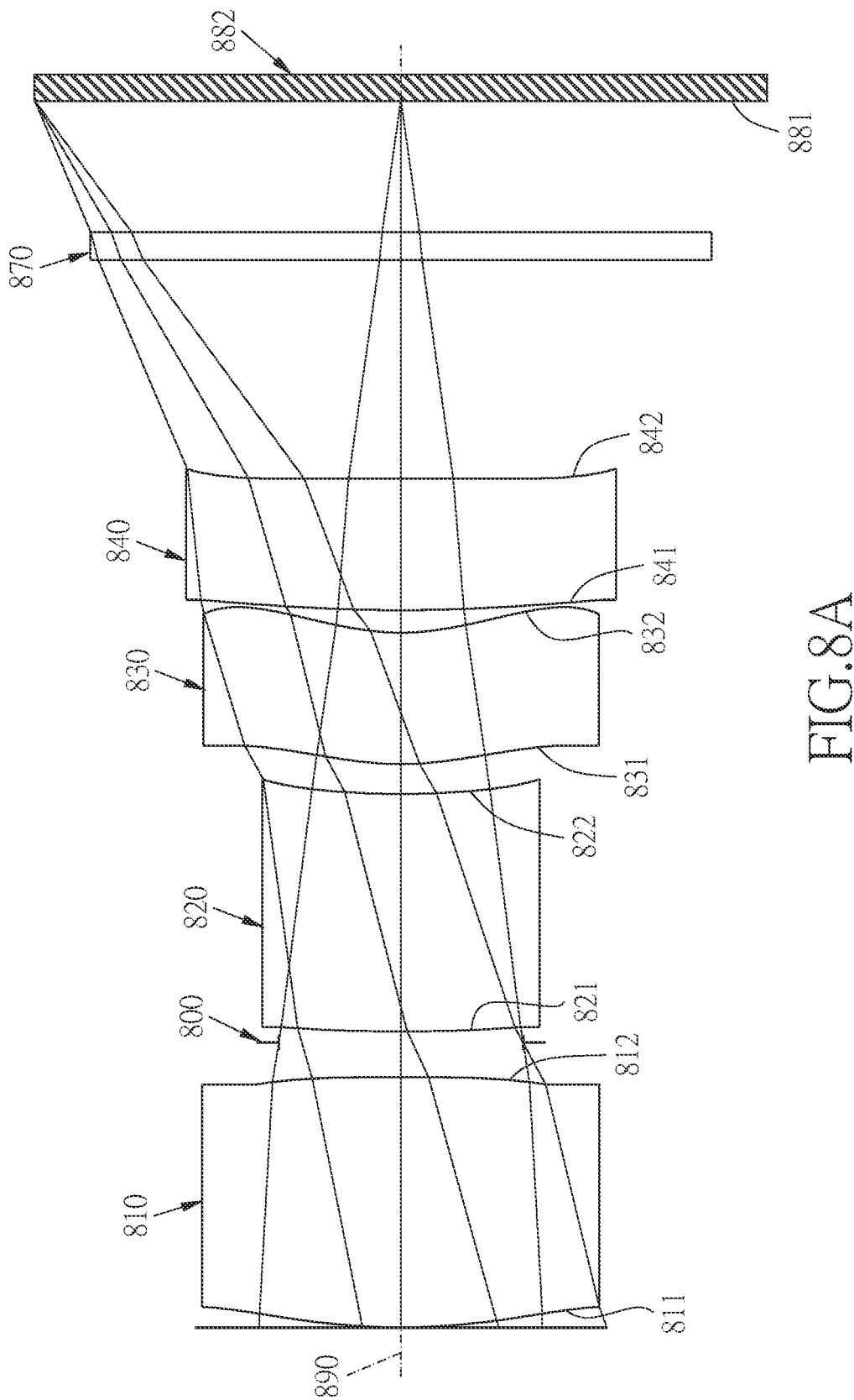
FIG. 8A shows an optical lens assembly in accordance with an eighth embodiment of the present invention.
Figure 8B:
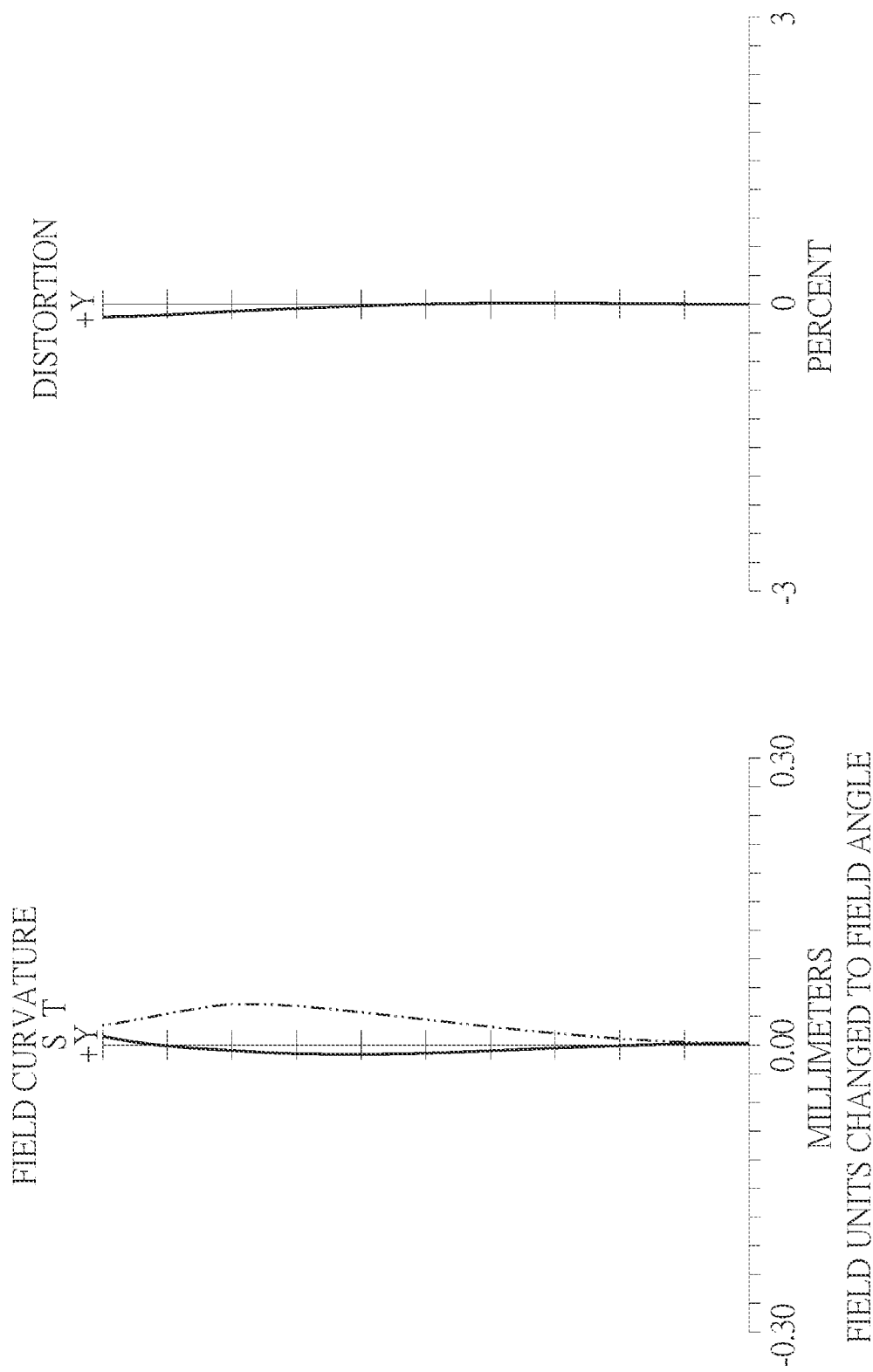
FIG. 8B shows the image plane curve and the distortion curve of the eighth embodiment of the present invention.

Referring to FIGS. 8A and 8B, FIG. 8A shows an optical lens assembly in accordance with an eighth embodiment of the present invention, and FIG. 8B shows, in order from left to right, the image plane curve and the distortion curve of the eighth embodiment of the present invention. An optical lens assembly in accordance with the eighth embodiment of the present invention comprises a stop 800 and a lens group. The optical lens assembly is provided with an image sensor 882. The lens group comprises, in order from an object side to an image side along an optical axis 890: a first lens 810, a second lens 820, a third lens 830, a fourth lens 840, an IR-cut filter 870, and an image plane 881, wherein the optical lens assembly has a total of four lenses with refractive power, but not limited to this. The stop 800 is disposed between the first lens 810 and the second lens 820. The image sensor 882 is disposed on the image plane 881.

The first lens 810 with positive refractive power, comprising an object-side surface 811 and an image-side surface 812, the object-side surface 811 of the first lens 810 being convex near the optical axis 890 and the image-side surface 812 of the first lens 810 being convex near the optical axis 890, the object-side surface 811 and the image-side surface 812 of the first lens 810 are aspheric, and the first lens 810 is made of plastic material.

The second lens 820 with negative refractive power, comprising an object-side surface 821 and an image-side surface 822, the object-side surface 821 of the second lens 820 being convex near the optical axis 890 and the image-side surface 822 of the second lens 820 being concave near the optical axis 890, the object-side surface 821 and the image-side surface 822 of the second lens 820 are aspheric, and the second lens 820 is made of plastic material.

The third lens 830 with negative refractive power, comprising an object-side surface 831 and an image-side surface 832, the object-side surface 831 of the third lens 830 being convex near the optical axis 890 and the image-side surface 832 of the third lens 830 being concave near the optical axis 890, the object-side surface 831 and the image-side surface 832 of the third lens 830 are aspheric, and the third lens 830 is made of plastic material.

The fourth lens 840 with positive refractive power, comprising an object-side surface 841 and an image-side surface 842, the object-side surface 841 of the fourth lens 840 being convex near the optical axis 890 and the image-side surface 842 of the fourth lens 840 being convex near the optical axis 890, the object-side surface 841 and the image-side surface 842 of the fourth lens 840 are aspheric, and the fourth lens 840 is made of plastic material.

The IR-cut filter 870 made of glass is located between the fourth lens 840 and the image plane 881 and has no influence on the focal length of the optical lens assembly. The IR-cut filter 870 can also be formed on the surfaces of the lenses and made of other materials.

The detailed optical data of the eighth embodiment is shown in table 15, and the aspheric surface data is shown in table 16.

TABLE 15

Embodiment 8 f(focal length) = 7.61 mm, Fno = 3.4, FOV = 40.0 deg.

| surface | | Curvature Radius | | Thickness/gap | Material | Index(nd) | Abbe #(vd) | Focal length |
|---|---|---|---|---|---|---|---|---|
| 0 | object | infinity | | infinity | | | | |
| 1 | Lens 1 | 4.742 | (ASP) | 1.903 | plastic | 1.54 | 56 | 7.70 |
| 2 | | −32.035 | (ASP) | 0.262 | | | | |
| 3 | stop | infinity | | 0.085 | | | | |
| 4 | Lens 2 | 15.931 | (ASP) | 1.803 | plastic | 1.66 | 20.37 | −13.76 |
| 5 | | 5.561 | (ASP) | 0.226 | | | | |
| 6 | Lens 3 | 2.200 | (ASP) | 0.999 | plastic | 1.54 | 56 | −600.00 |
| 7 | | 1.835 | (ASP) | 0.172 | | | | |
| 8 | Lens 4 | 12.075 | (ASP) | 0.999 | plastic | 1.66 | 20.37 | 15.93 |
| 9 | | −85.549 | (ASP) | 1.662 | | | | |
| 10 | IR-cut filter | infinity | | 0.210 | glass | 1.52 | 64.20 | |
| 11 | | infinity | | 1.000 | | | | |
| 12 | Image plane | infinity | | — | | | | |

Note:
reference wavelength is 555 nm

TABLE 16

Aspheric Coefficients

| surface | 1 | 2 | 4 | 5 |
|---|---|---|---|---|
| K: | −5.4216E+00 | 6.0260E+02 | 1.3753E+02 | −1.1273E+02 |
| A: | −4.9592E−03 | −2.0597E−02 | 6.8602E−03 | 2.2762E−02 |
| B: | −2.2853E−03 | −1.1068E−03 | 9.4815E−04 | 1.6598E−02 |
| C: | −3.3316E−04 | −1.1442E−03 | −4.2875E−03 | 2.7453E−03 |
| D: | 2.1578E−05 | 8.6726E−04 | 8.7833E−04 | −6.6723E−04 |
| E: | −1.2996E−05 | 1.0308E−04 | 0.0000E+00 | −6.1132E−04 |
| F: | 0.0000E+00 | 0.0000E+00 | 0.0000E+00 | 1.2011E−06 |
| G: | 0.0000E+00 | 0.0000E+00 | 0.0000E+00 | 0.0000E+00 |

| surface | 6 | 7 | 8 | 9 |
|---|---|---|---|---|
| K: | −1.2094E+01 | −5.4493E+00 | −1.8833E+02 | 9.6659E+02 |
| A: | −4.4891E−02 | −4.6837E−02 | −3.8483E−04 | 1.6191E−03 |
| B: | 7.7084E−03 | 6.2303E−03 | 6.0920E−03 | 3.0625E−03 |
| C: | 2.2965E−03 | −5.2626E−03 | −3.3898E−03 | 4.6730E−04 |
| D: | −3.3650E−04 | 1.3274E−03 | 7.8709E−04 | 5.3937E−05 |
| E: | −5.0041E−04 | −2.8733E−04 | −8.7256E−05 | 1.7622E−07 |
| F: | −2.0815E−04 | −1.9688E−05 | 8.7897E−06 | −1.0810E−05 |
| G: | −5.7838E−05 | −8.2570E−07 | −6.5551E−06 | 4.9233E−06 |

In the eighth embodiment, the equation of the aspheric surface profiles of the aforementioned lenses is the same as the equation of the first embodiment. Also, the definitions of these parameters shown in the following table are the same as those stated in the first embodiment with corresponding values for the eighth embodiment, so an explanation in this regard will not be provided again.

Moreover, these parameters can be calculated from Table 15 and Table 16 as the following values and satisfy the following conditions:

| Embodiment 8 | | | |
|---|---|---|---|
| f[mm] | 7.61 | CT1/CT2 | 1.06 |
| Fno | 3.40 | CT3/CT4 | 1.00 |
| FOV[deg.] | 40.00 | f/BFL | 2.65 |
| f1/f2 | −0.56 | TD/BFL | 2.25 |
| f3/f4 | −37.67 | SD/BFL | 1.49 |
| f12/f34 | 0.58 | EPD/IMH | 0.81 |
| R2/R7 | −2.65 | f/FOV | 0.19 |
| R5/R6 | 1.20 | f1/TD | 1.19 |

-continued

| Embodiment 8 | | | |
|---|---|---|---|
| R7/R8 | −0.14 | DT11/DT42 | 0.92 |
| EPD | 2.25 | | |

Figure 9:
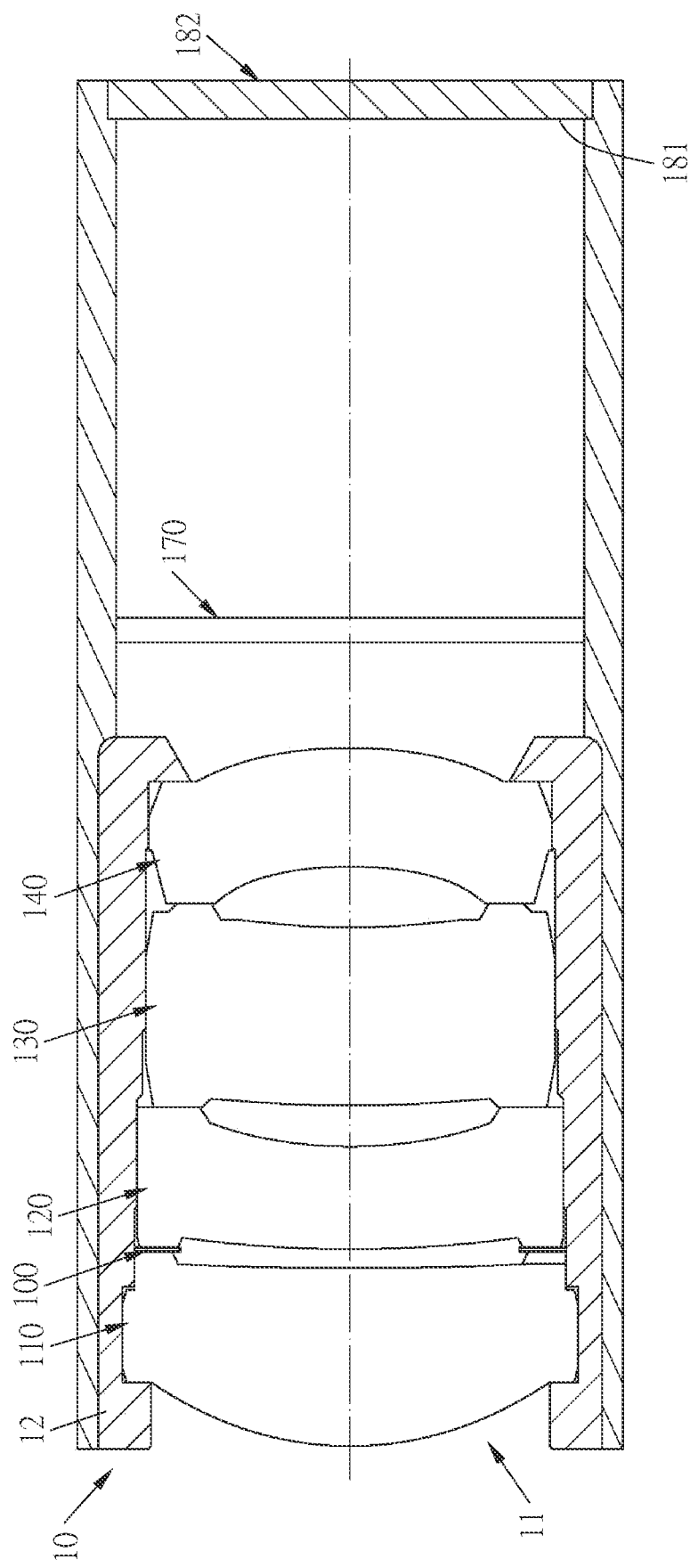
FIG. 9 shows a photographing module in accordance with a ninth embodiment of the present invention.

Referring to FIG. 9, which shows a photographing module in accordance with a ninth embodiment of the present invention, the photographing module is applied to a notebook, but not limited to this. The photographing module 10 includes an optical lens assembly 11, a lens barrel 12 and an image sensor 182. The optical lens assembly 11 is the optical lens assembly of the above first embodiment, but not limited to this, and can also be the optical lens assemblies of other embodiments. In addition, the lenses of the optical lens assembly in FIG. 9 show the unlit peripheral parts, which is slightly different from that of the first embodiment. The lens barrel 12 is provided for accommodating the optical lens assembly 11. The image sensor 182 is disposed on an image plane 181 of the optical lens assembly 11 and is an electronic sensor (such as, CMOS, CCD) with good brightness and low noise to really present the imaging quality of the optical lens assembly.

In the present optical lens assembly, the lenses can be made of plastic or glass. If the lenses are made of plastic, the cost will be effectively reduced. If the lenses are made of glass, there is more freedom in distributing the refractive power of the optical lens assembly. Plastic lenses can have aspheric surfaces, which allow more design parameter freedom (than spherical surfaces), so as to reduce the aberration and the number of the lenses, as well as the total length of the optical lens assembly.

In the present optical lens assembly, if the object-side or the image-side surface of the lenses with refractive power is convex and the location of the convex surface is not defined, the object-side or the image-side surface of the lenses near the optical axis is convex. If the object-side or the image-side surface of the lenses is concave and the location of the concave surface is not defined, the object-side or the image-side surface of the lenses near the optical axis is concave.

The optical lens assembly of the present invention can be used in focusing optical systems and can obtain better image quality. The optical lens assembly of the present invention can also be used in electronic imaging systems, such as, 3D image capturing, digital camera, mobile device, digital flat panel or vehicle camera.

While we have shown and described various embodiments in accordance with the present invention, it should be clear to those skilled in the art that further embodiments may be made without departing from the scope of the present invention.

What is claimed is:

1. An optical lens assembly, in order from an object side to an image side, comprising:
    a first lens with positive refractive power, comprising an object-side surface and an image-side surface, the object-side surface of the first lens being convex near an optical axis, and at least one of the object-side surface and the image-side surface of the first lens being aspheric;
    a stop;
    a second lens with negative refractive power, comprising an object-side surface and an image-side surface, the object-side surface of the second lens being convex near the optical axis and the image-side surface of the second lens being concave near the optical axis, and at least one of the object-side surface and the image-side surface of the second lens being aspheric;
    a third lens with negative refractive power, comprising an object-side surface and an image-side surface, the image-side surface of the third lens being concave near the optical axis, and at least one of the object-side surface and the image-side surface of the third lens being aspheric;
    a fourth lens with positive refractive power, comprising an object-side surface and an image-side surface, the image-side surface of the fourth lens being convex near the optical axis, and at least one of the object-side surface and the image-side surface of the fourth lens being aspheric;
    wherein a focal length of the optical lens assembly is f, the optical lens assembly has a maximum view angle (field of view) FOV, a distance from the image-side surface of the fourth lens to an image plane along the optical axis is BFL, and following conditions are satisfied: $0.16 < f/FOV < 1.27$ and $1.22 < f/BFL < 3.8$.

2. The optical lens assembly as claimed in claim 1, wherein a focal length of the first lens is f1, a focal length of the second lens is f2, and following condition is satisfied: $-1.05 < f1/f2 < -0.23$.

3. The optical lens assembly as claimed in claim 1, wherein a focal length of the third lens is f3, a focal length of the fourth lens is f4, and following condition is satisfied: $-45.21 < f3/f4 < 0$.

4. The optical lens assembly as claimed in claim 1, wherein a radius of curvature of the image-side surface of the first lens is R2, a radius of curvature of the object-side surface of the fourth lens is R7, and following condition is satisfied: $-7.21 < R2/R7 < 0$.

5. The optical lens assembly as claimed in claim 1, wherein a central thickness of the first lens along the optical axis is CT1, a central thickness of the second lens along the optical axis is CT2, and following condition is satisfied: $0.32 < CT1/CT2 < 2.41$.

6. The optical lens assembly as claimed in claim 1, wherein a central thickness of the third lens along the optical axis is CT3, a central thickness of the fourth lens along the optical axis is CT4, and following condition is satisfied: $0.39 < CT3/CT4 < 1.80$.

7. The optical lens assembly as claimed in claim 1, wherein a distance from the object-side surface of the first lens to the image-side surface of the fourth lens along the optical axis is TD, the distance from the image-side surface of the fourth lens to an image plane along the optical axis is BFL, and following condition is satisfied: $0.53 < TD/BFL < 2.78$.

8. The optical lens assembly as claimed in claim 1, wherein a focal length of the first lens is f1, a distance from the object-side surface of the first lens to the image-side surface of the fourth lens along the optical axis is TD, and following condition is satisfied: $0.68 < f1/TD < 1.55$.

9. The optical lens assembly as claimed in claim 1, wherein a f-number of the optical lens assembly is Fno, and following condition is satisfied: $2.70 < Fno < 3.82$.

10. A photographing module, comprising:
    an optical lens assembly,
    a lens barrel for receiving the optical lens assembly, and
    an image sensor disposed on an image plane of the optical lens assembly,
    wherein the optical lens assembly, in order from an object side to an image side, comprising:
    a first lens with positive refractive power, comprising an object-side surface and an image-side surface, the object-side surface of the first lens being convex near an optical axis, and at least one of the object-side surface and the image-side surface of the first lens being aspheric;
    a stop;
    a second lens with negative refractive power, comprising an object-side surface and an image-side surface, the object-side surface of the second lens being convex near the optical axis and the image-side surface of the second lens being concave near the optical axis, and at least one of the object-side surface and the image-side surface of the second lens being aspheric;
    a third lens with negative refractive power, comprising an object-side surface and an image-side surface, the image-side surface of the third lens being concave near the optical axis, and at least one of the object-side surface and the image-side surface of the third lens being aspheric;
    a fourth lens with positive refractive power, comprising an object-side surface and an image-side surface, the image-side surface of the fourth lens being convex near the optical axis, and at least one of the object-side surface and the image-side surface of the fourth lens being aspheric;
    wherein a focal length of the optical lens assembly is f, the optical lens assembly has a maximum view angle (field of view) FOV, a distance from the image-side surface of the fourth lens to an image plane along the optical axis is BFL, and following conditions are satisfied: $0.16 < f/FOV < 1.27$ and $1.22 < f/BFL < 3.8$.

11. The photographing module as claimed in claim 10, wherein a focal length of the first lens is f1, a focal length of the second lens is f2, and following condition is satisfied: −1.05<f1/f2<−0.23.

12. The photographing module as claimed in claim 10, wherein a central thickness of the first lens along the optical axis is CT1, a central thickness of the second lens along the optical axis is CT2, and following condition is satisfied: 0.32<CT1/CT2<2.41.

13. The photographing module as claimed in claim 10, wherein a focal length of the first lens is f1, a distance from the object-side surface of the first lens to the image-side surface of the fourth lens along the optical axis is TD, and following condition is satisfied: 0.68<f1/TD<1.55.

14. A photographing module, comprising:
a lens barrel,
an optical lens assembly disposed in the lens barrel, and
an image sensor disposed on an image plane of the optical lens assembly,
wherein the optical lens assembly, in order from an object side to an image side, comprising:
a first lens with positive refractive power, comprising an object-side surface and an image-side surface, the object-side surface of the first lens being convex near an optical axis, and at least one of the object-side surface and the image-side surface of the first lens being aspheric;
a stop;
a second lens with negative refractive power, comprising an object-side surface and an image-side surface, the object-side surface of the second lens being convex near the optical axis and the image-side surface of the second lens being concave near the optical axis, and at least one of the object-side surface and the image-side surface of the second lens being aspheric;
a third lens with negative refractive power, comprising an object-side surface and an image-side surface, the image-side surface of the third lens being concave near the optical axis, and at least one of the object-side surface and the image-side surface of the third lens being aspheric;
a fourth lens with positive refractive power, comprising an object-side surface and an image-side surface, the image-side surface of the fourth lens being convex near the optical axis, and at least one of the object-side surface and the image-side surface of the fourth lens being aspheric;
wherein an incident pupil aperture of the optical lens assembly is EPD, half of an image height that can be captured by the optical lens assembly on the image plane is IMH, a focal length of the optical lens assembly is f, a distance from the image-side surface of the fourth lens to the image plane along the optical axis is BFL, and following conditions are satisfied: 0.65<EPD/IMH<2.83 and 1.22<f/BFL<3.8.

15. The photographing module as claimed in claim 14, wherein the focal length of the optical lens assembly is f, the optical lens assembly has a maximum view angle (field of view) FOV, and following condition is satisfied: 0.16<f/FOV<1.27.

16. The photographing module as claimed in claim 15, wherein a focal length of the first lens is f1, a focal length of the second lens is f2, and following condition is satisfied: −1.05<f1/f2<−0.23.

17. The photographing module as claimed in claim 15, wherein a central thickness of the first lens along the optical axis is CT1, a central thickness of the second lens along the optical axis is CT2, and following condition is satisfied: 0.32<CT1/CT2<2.41.

* * * * *